US010765939B2

(12) United States Patent
Shitara

(10) Patent No.: US 10,765,939 B2
(45) Date of Patent: Sep. 8, 2020

(54) INFORMATION PROCESSING SYSTEM, TERMINAL DEVICE, COMPUTER-READABLE NON-TRANSITORY STORAGE MEDIUM, AND INFORMATION PROCESSING METHOD

(71) Applicant: GREE, Inc., Tokyo (JP)

(72) Inventor: Shusuke Shitara, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/237,816

(22) Filed: Jan. 2, 2019

(65) Prior Publication Data

US 2019/0217190 A1    Jul. 18, 2019

(30) Foreign Application Priority Data

Jan. 12, 2018 (JP) ................................. 2018-003571
Aug. 2, 2018 (JP) ................................. 2018-145599

(51) Int. Cl.
*A63F 13/30* (2014.01)
*A63F 13/71* (2014.01)
*A63F 13/792* (2014.01)

(52) U.S. Cl.
CPC .............. *A63F 13/30* (2014.09); *A63F 13/71* (2014.09); *A63F 13/792* (2014.09)

(58) Field of Classification Search
CPC .......... A63F 13/30; A63F 13/69; A63F 13/71; A63F 13/79; A63F 13/792; A63F 13/85; A63F 2300/5546; A63F 2300/57
See application file for complete search history.

(56) References Cited

U.S. PATENT DOCUMENTS

2005/0267610 A1*  12/2005  Shinoda ................. A63F 13/12
                                                              700/92
2006/0143285 A1*   6/2006  St-Denis ............... G06Q 30/02
                                                              709/217

(Continued)

FOREIGN PATENT DOCUMENTS

JP           2013-208301 A        10/2013
JP           2014-016992 A         1/2014

(Continued)

OTHER PUBLICATIONS

Office Action dated Oct. 1, 2019 issued in corresponding Japanese Patent Application No. 2018-145599 with English translation.

*Primary Examiner* — Jasson H Yoo
(74) *Attorney, Agent, or Firm* — Pillsbury Winthrop Shaw Pittman, LLP

(57) ABSTRACT

An information processing system includes one or more server devices functioning as a first platform that provides a first game to a first user having a first account, and one or more terminal devices. The one or more terminal devices transmit, to the first platform, an authenticated ID of a second user having a second account of a second platform that provides a second game. The authenticated ID is authenticated by using information concerning the second account. The first platform generates a specific ID upon receiving the authenticated ID, stores the authenticated ID and the specific ID in association with each other, and provides the first game to the second user using the specific ID associated with the authenticated ID.

10 Claims, 16 Drawing Sheets

(56) References Cited

U.S. PATENT DOCUMENTS

2009/0055908 A1* 2/2009 Rapoport ............ H04L 63/0815
  726/6
2011/0086706 A1* 4/2011 Zalewski ................ A63F 13/12
  463/36

FOREIGN PATENT DOCUMENTS

| JP | 2015-015973 A | 1/2015 |
| JP | 5841280 B1 | 1/2016 |
| WO | 2017/072856 A1 | 8/2018 |

* cited by examiner

| Information Concerning First Account | | | First Game Data | | First Virtual Currency |
|---|---|---|---|---|---|
| User ID | Password | Authenticated ID | First Game A1 | First Game B1 | |
| | | | ... | ... | ... |
| U1-01 (Normal ID) | *** | -- | *** | *** | 1000 |
| U1-02S (Specific ID) | -- | *** | *** | -- | -- |
| ... | ... | ... | ... | ... | ... |

Fig. 3

| Information Concerning Second Account || Second Game Data ||| Second Virtual Currency |
| --- | --- | --- | --- | --- | --- |
| User ID | Password | Second Game A2 | Second Game B2 | ... | |
| U2-01 | *** | *** | *** | ... | 2000 |
| ... | ... | ... | ... | ... | ... |

Fig. 5

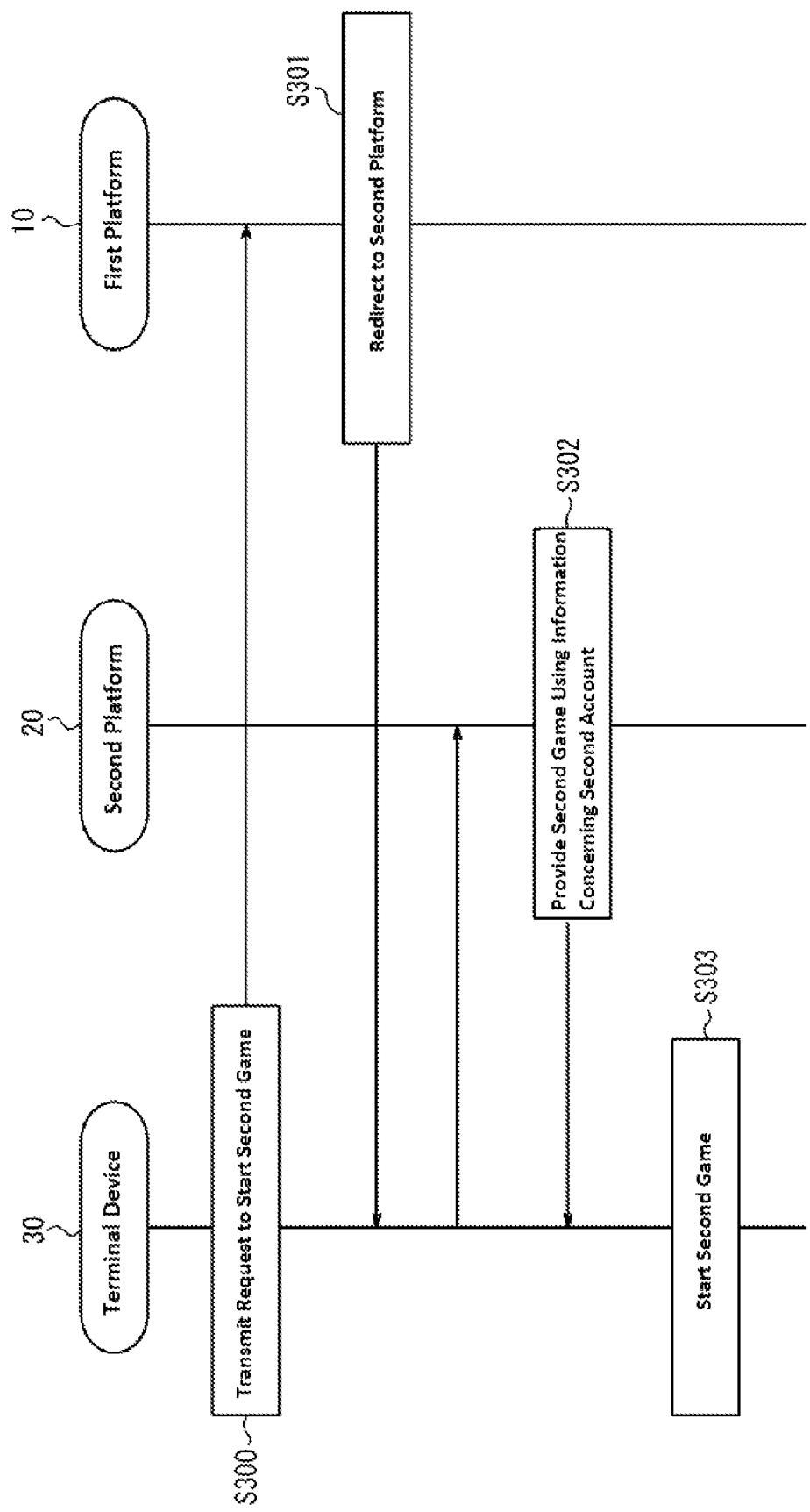

INFORMATION PROCESSING SYSTEM, TERMINAL DEVICE, COMPUTER-READABLE NON-TRANSITORY STORAGE MEDIUM, AND INFORMATION PROCESSING METHOD

CROSS-REFERENCE TO RELATED APPLICATIONS

This application is based on and claims the benefit of priority from Japanese Patent Application Serial No. 2018-003571 (filed on Jan. 12, 2018) and Japanese Patent Application Serial No. 2018-145599 (filed on Aug. 2, 2018), the contents of which are hereby incorporated by reference in its entirety.

TECHNICAL FIELD

The present disclosure relates to an information processing system, a terminal device, a computer-readable non-transitory storage medium storing a program, and an information processing method.

BACKGROUND

One or more server devices are typically used as a platform for providing a predetermined service to users who have registered in advance. For example, Japanese Patent No. 5841280 discloses a server device that provides a combat game to users who use their terminal devices.

Diversification of services provided to users registered in a platform has been desired. However, diversification of services may not always be easy to carry out. For example, in order to diversify services, it may be necessary to increase the number of server devices or enhance the performance of the server devices that function as the platform.

SUMMARY

In view of the above, one object of the disclosure is to provide an information processing system, a terminal device, a computer-readable non-transitory storage medium storing a program, and an information processing method that enable diversification of services provided to users registered in a platform.

An information processing system according to one aspect of the disclosure includes one or more server devices functioning as a first platform that provides a first game to a first user having a first account, and one or more terminal devices. The one or more terminal devices transmit, to the first platform, an authenticated ID of a second user having a second account of a second platform that provides a second game to the second user, the authenticated ID being authenticated by using information concerning the second account. The first platform generates a specific ID upon receiving the authenticated ID, stores the authenticated ID and the specific ID in association with each other, and provides the first game to the second user using the specific ID associated with the authenticated ID.

An information processing system according to another aspect of the disclosure includes one or more server devices functioning as a second platform that provides a second game to a second user having a second account, and one or more terminal devices. The one or more terminal devices transmit, to the second platform, information concerning the second account of the second user. The second platform transmits an authenticated ID of the second user to the one or more terminal devices, the authenticated ID being authenticated by using the information concerning the second account. The one or more terminal devices transmit the authenticated ID to a first platform that provides a first game to a first user having a first account, and starts the first game provided to the second user using an specific ID that is generated by the first platform and associated with the authenticated ID.

A terminal device according to yet another aspect of the disclosure includes a communication unit and a control unit. The communication unit is capable of communicating with one or more server devices functioning as a first platform that provides a first game to a first user having a first account. The control unit transmits a user authentication request using information concerning the second account to a second platform that provides a second game to a second user having a second account, transmits, to the first platform, an authenticated ID of the second user, the authenticated ID being authenticated by the second platform in response to the user authentication request, and starts the first game provided to the second user using an specific ID that is generated by the first platform and associated with the authenticated ID.

A computer-readable tangible non-transitory storage medium according to yet another aspect of the disclosure includes executable instructions that, when executed, cause a terminal device to perform: a step of communicating with one or more server devices functioning as a first platform that provides a first game to a first user having a first account a step of transmitting a user authentication request using information concerning a second account to a second platform that provides a second game to a second user having the second account; a step of transmitting, to the first platform, an authenticated ID of the second user, the authenticated ID being authenticated by the second platform in response to the user authentication request; and a step of starting the first game provided to the second user using an specific ID that is generated by the first platform and associated with the authenticated ID.

An information processing method according to another aspect of the disclosure is performed by a terminal device. The method includes: a step of communicating with one or more server devices functioning as a first platform that provides a first game to a first user having a first account a step of transmitting a user authentication request using information concerning a second account to a second platform that provides a second game to a second user having the second account; a step of transmitting, to the first platform, an authenticated ID of the second user, the authenticated ID being authenticated by the second platform in response to the user authentication request and a step of starting the first game provided to the second user using an specific ID that is generated by the first platform and associated with the authenticated ID.

With the information processing system, the terminal device, the computer-readable non-transitory storage medium storing a program, and the information processing method described above, it is possible to diversification of services provided to users registered in the platform.

BRIEF DESCRIPTION OF THE DRAWINGS

FIG. 3 illustrates information stored in the first server device.

FIG. 5 illustrates information stored in the second server device.

FIG. 16 is a sequence diagram showing a third operation of the information processing system.

DESCRIPTION OF THE PREFERRED EMBODIMENTS

Embodiments of the disclosure will be hereinafter described.

Configuration of Information Processing System

Figure 1:
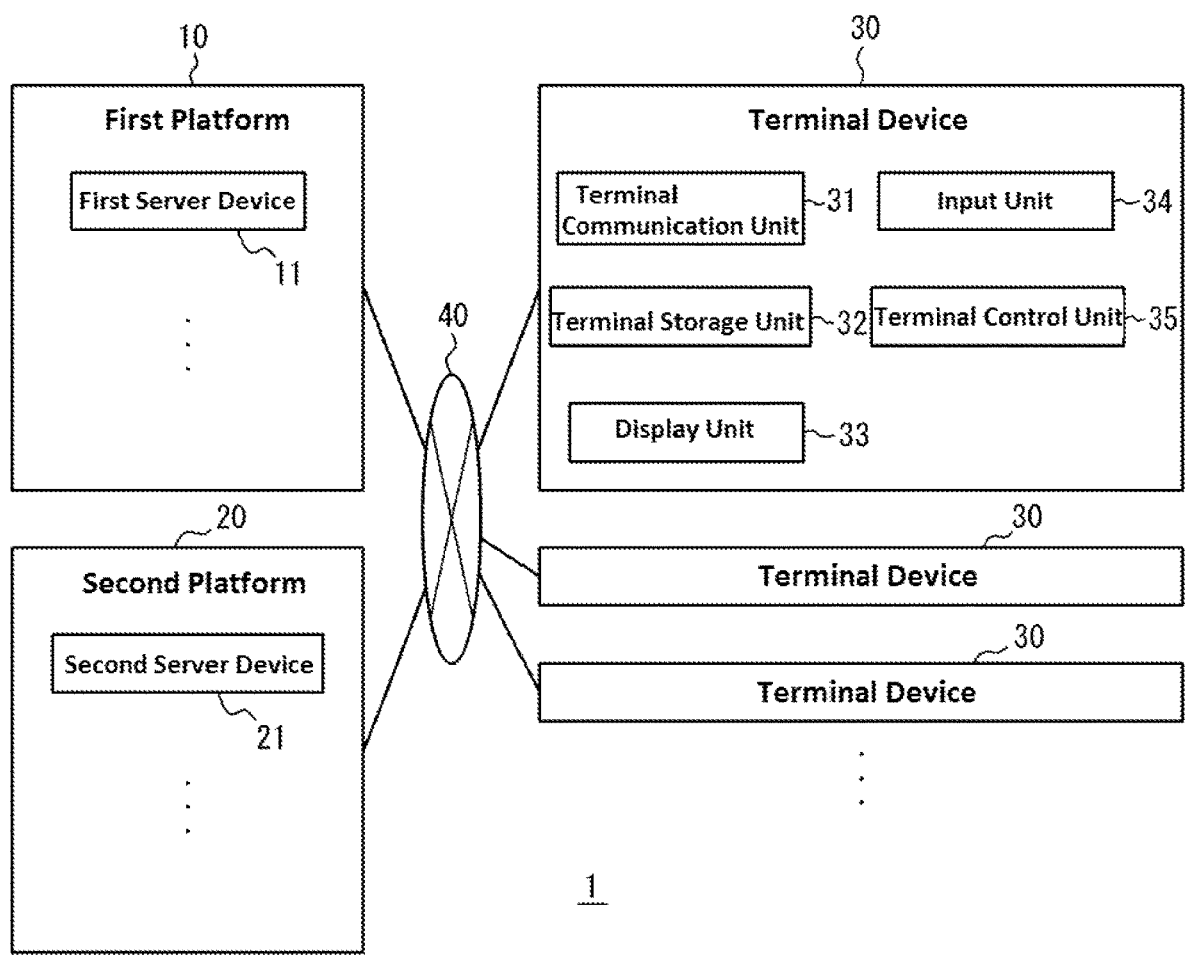
FIG. 1 is a block diagram illustrating an information processing system according to an embodiment of the disclosure.

With reference to FIG. 1, an overview of an information processing system 1 according to an embodiment of the disclosure will be described. The information processing system 1 includes a first platform device 10, a second platform device 20, and one or more terminal devices 30. The first platform 10, the second platform 20, and the one or more terminal devices 30 are interconnected to a network 40 such as the Internet. Although FIG. 1 shows the three terminal devices 30 for the sake of convenience, any number of terminal devices 30 may be provided. The first platform 10 and the second platform 20 may be used to provide services in competing fields. Providing the services in competing fields means, for example, that user segments to which the first and second platforms provide their services may overlap each other. In the embodiment, the first platform 10 and the second platform 20 are each used for providing games to users. However, the first platform 10 and the second platform 20 are used to provide not only services providing games, but also any network services such as a communication service providing functions including chat, bulletin board and the like, and a commodity sales service providing functions including net shopping, net auction and the like.

A game in the embodiment may include one or more game parts. At least one of the one or more game parts may be executed using a game content described later. During execution of a game part, a game content may be operated, for example, by a user or AI (Artificial Intelligence). The AI may be realized by a processor.

The game content is electronic data used in a game and may be any content such as a card, an item, a virtual currency, a ticket, a character, an avatar, level information, status information, parameter information (health, attack, and the like), and statics information (skills, abilities, magic, jobs and the like). The game content is electronic data that may be obtained, possessed, used, managed, exchanged, integrated, reinforced, sold, discarded, or donated by a user in a game. However, how game contents are used in a game may not be limited to those described in this specification.

In the following description, unless explicitly stated otherwise, a "game content possessed by a user" refers to a game content associated with a user ID with which the user can be identified uniquely. "Imparting a game content to a user" refers to associating the game content with the user ID. "Discarding a game content that a user possesses" refers to dissolving the association between the user ID and the game content. "Consuming a game content that a user possesses" means that some effect or influence may be exerted in the game in response to dissolution of the association between the user ID and the game content. "Selling a game content that a user possesses" refers to dissolving the association between the user ID and the game content and reassociating the user ID with another game content (such as virtual currency or an item). "Transferring a game content possessed by user A to user B" refers to dissolving the association between the user ID of the user A and the game content and reassociating the user ID of the user B with the game content. "Creating a game content" refers to defining or determining at least a part of information about the game content.

A game part may include any content that a user is able to play in the game. For example, a game part may include contents such as a quest, a mission, a mini game, acquisition, training, reinforcement and integration of a game content, exploring in a virtual space, and a battle with an opponent (e.g., other user, enemy character, enemy building and the like). For each game part, one or more predetermined game tasks may be set. For example, when it is determined that one or more predetermined game tasks set for each game part played by a user are successfully satisfied, a game content or the like may be given to the user as a reward. An example of the game task include, for example, winning a battle against an enemy character, reaching a goal point in a virtual space, maintaining a user's character so as not to fall in a predetermined state (for example, a state where the character's health is zero, which will be described later), or any tasks according to the contents of the game part can be adopted. Completion of a specific task (a task to be completed) among one or more game tasks set in a game part may also be referred to as clearing of the game part. When a user who plays a game part succeeds in completing the task to be completed, it may be determined that the user cleared the game part and the game part may be ended.

One or more game parts may include a single-player game part and a multi-player game part. The single-player game part may include, for example, a game part executed on the basis of a single user operation on one terminal device 30 used by the user (for example, a game part that is to be played by only one player). For example, the terminal device 30 alone or in conjunction with the first platform 10 and the second platform 20, executes the single-player game part. On the other hand, multi-player game parts may include a game part that is common to two or more users and executed on the basis of users' operations on two or more terminal devices 30 used by the two or more users (for example, a game part that it to be played by more than one player). The game part common to two or more users may include, for example, a game part in which at least a part of advancement processing and processing results of the game part may be commonly applied to the two or more users. For example, two or more terminal devices 30 execute a multi-player game part in cooperation, or the two or more terminal devices 30 and the first platform 10 or the second platform 20 execute the multi-player game content in cooperation. The multi-player game part may include a game part in which a plurality of users battle or cooperate in the game. One game part may compatible with both the singleplay and the multiplay.

In summary, the first platform 10 has a function of providing one or more games to a user having an account dedicated to the first platform 10. An account is created for a user, for example, in response to completion of user registration to the first platform 10. The one or more games may include a game developed by any game developer that is the same as or different from an administrator of the first platform 10. Moreover, the first platform 10 may further have a function for allowing users having the accounts to communicate with each other (for example, a message transmission and reception function) and a function for managing a virtual currency dedicated to the first platform 10 (for example, a payment function for users to purchase a virtual currency, etc.). For example, a user logs in to the first platform 10 using information about his/her account (for example, a user ID and a password), and once logged in to the platform, the user is able to play a game provided by the first platform 10, communicate with other users, purchase a virtual currency and the like.

Hereinafter, an account dedicated to the first platform 10 is also referred to as a first account. A user who has acquired the first account through user registration is also referred to as a first user. A game provided by the first platform 10 is also referred to as a first game. A virtual currency used only in the first platform 10 is also referred to as a first virtual currency.

The first platform 10 includes one or more first server devices 11. The one or more first server devices 11 serve as the first platform 10. The first platform 10 may include a plurality of the first server devices 11 whose administrators are different from each other. For example, there may be the first server device 11 managed by an administrator of the first platform 10 and another first server device 11 managed by a third party (for example, a provider or developer of the first game) different from the administrator of the first server device 11. For sake of simplicity, the first platform 10 is hereunder described as it includes a single first server device 11. However, it is also possible to have a configuration in which the configuration and functions of the single first server device 11 are appropriately distributed among a plurality of first server devices 11. Details of the first server device 11 will be described later.

In brief, the second platform 20 is similar to the first platform 10 except that its administrator is different from that of the first platform 10. Hereinafter, an account dedicated to the second platform 20 is also referred to as a second account. A user who has acquired the second account through user registration is also referred to as a second user. A game provided by the second platform 20 is also referred to as a second game. A virtual currency used only in the second platform 20 is also referred to as a second virtual currency.

The second platform 20 includes one or more second server devices 21. The one or more second server devices 21 serve as the second platform 20. For sake of simplicity, the second platform 20 is described as it includes a single second server device 21. However, it is also possible to have a configuration in which the configuration and functions of the single second server device 21 are appropriately distributed among a plurality of second server devices 21. Details of the second server device 21 will be described later.

The terminal device 30 may be an information processing apparatus used by a user, such as a mobile phone, a smart phone, a tablet device, a personal computer (PC) and a game machine. The terminal device 30 can use various functions of the first platform 10 or the second platform 20 by using a general-purpose or dedicated application(s). The application may have, for example, a web browser function. The application may be obtained from a predetermined application distribution server over the network 40 by the terminal device 30 or may be stored in advance in a storage device provided in the terminal device 30 or in a storage medium such as a memory card or the like readable by the terminal device 30.

For example, the first server device 11 and the terminal device 30 perform a plurality of processes concerning the various functions of the first platform 30 in conjunction with each other. For example, the first server device 11 and the terminal device 30 may share execution of a series of processes. Further, for example, the first server device 11 and the terminal device 30 may execute the identical process. With respect to the identical process, when the processing results match between the first server device 11 and the terminal device 30, the first server device 11 and the terminal device 30 may finish the process. Whereas when the processing results do not match between the first server device 11 and the terminal device 30, the first server device 11 and the terminal device 30 may determine that the processing result of the first server device 11 is the correct result and finish the process, or the process may go back to the state before the execution of the identical process. In such a configuration, for example, even when a communication quality between the first server device 11 and the terminal device 30 is temporarily deteriorated, a likelihood of immediate interruption of processing is low. Further, in the terminal device 30, even if an illegal process such as rewriting of a game parameter is performed, it is possible to increase a likelihood that the illegal process can be eliminated. The second server device 21 and the terminal device 30 also perform a plurality of processes concerning the various functions of the second platform 20 in conjunction with each other.

In the embodiment, there are two methods for a user to acquire the first account of the first platform 10. In one method, the user performs user registration on the first platform 10 as described above. Specifically, the user accesses the first platform 10 using the terminal device 30 and performs a predetermined procedure related to user registration (for example, new registration of a user ID and a password, etc.). Upon completion of the procedure, the first account is created for the user.

Whereas in another method, a second user using the second platform 20 performs an authentication and connection process to connect with the first platform 10. For example, OpenID Connect is used for the authentication process to connect with the first platform, but any protocol can be adopted. In the authentication and connection, the second platform 20 serves as an OP (OpenID Provider), and the first platform 10 serves as a RP (Relying Party). More specifically, the second user accesses the second platform 20 using the terminal device 30 and performs a predetermined procedure related to user authentication (for example, input a user ID and a password of the second account). Upon completion of the procedure, the first platform 10 is notified of an authenticated ID (for example, an ID token) authenticated by the second platform 20. In response to the notification of the authenticated ID, the first account is created for the second user. Through the above-described process, the second user using the second platform 20 is able to use the various functions of the first platform 10 in addition to the various functions of the second platform 20. In this way, it is possible to diversify the services provided to the second user registered in the second platform 20.

Moreover, the first platform 10 may manage the first user and the second user having the first account distinctively. Moreover, functions available in the first platform 10 may be different between the first user and the second user who have the first account. For example, the first platform 10 provides a plurality of first games to the first user who has acquired the first account through the user registration, while providing only some of the plurality of first games to the second user who has acquired the first account through the above-described authentication and connection process. With this configuration, for example, occurrence of inconveniences described below can be reduced.

For example, a case where the first platform 10 and the second platform 20 are used to provide services in competing fields will be described. In this case, if all the functions of the first platform 10 are made available to the second user who has acquired the first account through the authentication and connection process, the second platform 20 becomes less attractive to the second user and the second user may eventually stop using the second platform 20 and only use the first platform 10. For this reason, the administrator of the second platform 20 may not be able to positively make the functions of the first platform 10 available to the second user. Whereas in the embodiment, the second user who has acquired the first account through the authentication and connection process is allowed to use only a part of the functions of the first platform 10. This reduces the chance of unfavorable situations where users shift their interests from the second platform 20 to the first platform 10. The details of the embodiment will be now described below.

Configuration of First Server Device

Figure 2:
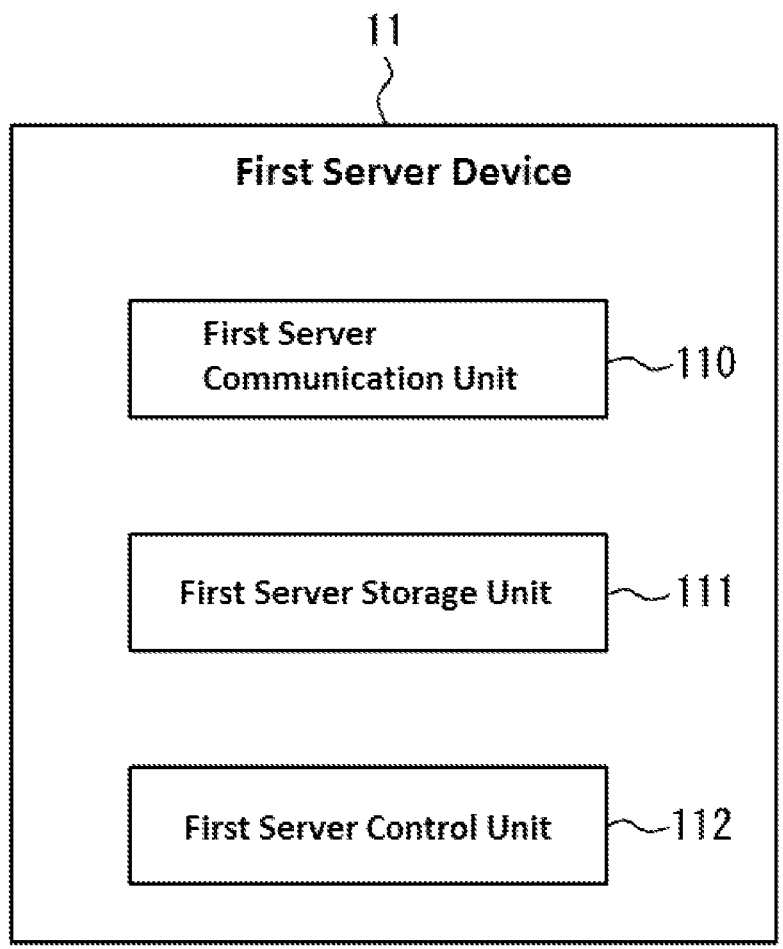
FIG. 2 is a block diagram schematically showing the configuration of a first server device.

The configuration of the first server device 11 will be specifically described with reference to FIG. 2. The first server device 11 includes a first server communication unit 110, a first server storage unit 111, and a first server control unit 112.

The first server communication unit 110 includes one or more interfaces that communicate with external devices in a wired or wireless manner and transmit and receive information thereto/therefrom. The first server communication unit 110 may include, for example, a wireless local area network (LAN) communication module or a wired LAN communication module. The first server communication unit 110 is communicably connected with the network 40.

The first server storage unit 111 includes one or more memory units. For example, the memory unit may include a semiconductor memory, a magnetic memory, an optical memory, or the like. Each memory unit included in the first server storage unit 111 may serves as, for example, a primary storage, a secondary storage, or a cache memory. The first server storage unit 111 may be built in the first server device 11 or may be connected to the first server device 11 via an interface. The first server storage unit 111 stores information and programs used for operation of the first server device 11.

For example, the first server storage unit 111 stores information concerning each user having the first account. For example, as shown in FIG. 3, the information concerning the user who has the first account includes information concerning the first account, first game data, and the first virtual currency. For sake of simplicity, FIG. 3 shows information on each of two users having the first account.

The information concerning the first account includes any information unique to the first account of a user. For example, the information concerning the first account includes a user ID and a password or an authenticated ID.

The user ID included in the information concerning the first account is information that can uniquely identify the user having the first account in the first platform 10. In the embodiment, the first user who has acquired the first account through the user registration and the second user who has acquired the first account through the authentication and connection process are distinguished by the user ID included in the information concerning the first account. For example, the user ID of the first user who has acquired the first account through the user registration may be determined based on user operation or automatically at the time of the user registration. Whereas the user ID of the second user who has acquired the first account through the authentication and connection process may be automatically determined during the authentication and connection process such that the user ID includes a predetermined character string as a prefix or a suffix. However, the method of managing the first user and the second user who have acquired the first account distinctively from each other is not limited to this. For example, the information concerning the first account may further include a flag indicating whether the user corresponding to the user ID has acquired the first account through the user registration or the authentication and connection process. Hereinafter a user ID of the first user who has acquired the first account through the user registration is also referred to as a normal ID. Further a user ID of the second user who has acquired the first account through the authentication and connection process is also referred to as a specific ID. For example, the user ID "U1-01" shown in FIG. 3 is the normal ID and the user ID "U1-02S" is the specific ID.

The password is set for the first user who has acquired the first account through the user registration. For example, the password may be determined based on user operation or automatically when the user performs the user registration with the first platform 10. For example, as shown in FIG. 3, while the password is set for the user ID "U1-01 (the normal ID)", the password is not set for the user ID "U1-02S (the specific ID)." The first user who has acquired the first account through the user registration is able to log in to the first platform 10 using the normal ID and the password.

The authenticated ID is set for the second user who has acquired the first account through the authentication and connection process. For example, as shown in FIG. 3, while the authenticated ID is not set for the user ID "U1-01 (the normal ID)", the authenticated ID is set for the user ID "U1-02S (the specific ID)." The authenticated ID is information uniquely identifying the second user authenticated by the second platform 20. The authenticated ID may include, for example, an ID token generated by the second platform 20. The second user who has acquired the first account through the authentication and connection process is able to log in to the first platform 10 using the user ID and the authenticated ID.

The first game data includes any information on each first game played by a user. For example, the first game data may include save data of the first game played by the user. For example, the first game interrupted in the past can be resumed using the first game data.

The first virtual currency is a virtual currency on the first platform 10 possessed by the first user who has acquired the first account through the user registration. The first virtual currency is used by the first user when he/she uses the various functions of the first platform 10. For example, the first user may be able to consume the first virtual currency to obtain a game content such as an item or a character in the first game. In the embodiment, only the users who have acquired the first account through user registration are allowed to acquire the first virtual currency. For example, the first user can purchase the first virtual currency using a payment function of the first platform 10. Whereas the second user who has acquired the first account through the authentication and connection process is not allowed to acquire the first virtual currency. For example, the second user cannot use the payment function of the first platform 10. However, as will be described later, the second user may be able to use the functions of the first platform 10 by consuming the second virtual currency possessed by the second user on the second platform 20 instead of the first virtual currency.

The information stored in the first server storage unit 111 is not limited to the above examples. The first server storage unit 111 may further store any information used for operations of the first server device 11.

The first server control unit 112 shown in FIG. 1 includes one or more processors. The processor may include a general purpose processor and a dedicated processor dedicated to a specific processing. The first server control unit 112 controls operations of the first server device 11 as a whole. The operation of the first server device 11 controlled by the first server control unit 112 will be described later.

Configuration of Second Server Device

The configuration of the second server device 21 will be specifically described with reference to FIG. 4. The second server device 21 includes a second server communication unit 210, a second server storage unit 211, and a second server control unit 212.

The second server communication unit 210 includes one or more interfaces that communicate with external devices in a wired or wireless manner and transmit and receive information thereto/therefrom. The second server communication unit 210 may include, for example, a wireless LAN communication module or a wired LAN communication module. The second server communication unit 210 is communicably connected with the network 40.

The second server storage unit 211 includes one or more memory units. Each memory unit included in the second server storage unit 211 may serves as, for example, a primary storage, a secondary storage, or a cache memory. The second server storage unit 211 may be built in the second server device 21 or may be connected to the second server device 21 via an interface. The second server storage unit 211 stores information and programs used for operation of the second server device 21.

For example, the second server storage unit 211 stores information concerning each user having the second account. For example, as shown in FIG. 5, the information concerning the user who has the second account includes information concerning the second account, second game data, and the second virtual currency. For sake of simplicity, FIG. 5 shows information concerning two users having the second account.

The information concerning the second account includes any information unique to the second account of a user. For example, the information concerning the second account includes a user ID and a password.

The user ID included in the information concerning the second account is information that can uniquely identify the user having the second account in the second platform 20. For example, the user ID of the second user who has acquired the second account through the user registration may be determined based on user operation or automatically at the time of the user registration.

The password is set for the user who has acquired the second account. For example, the password may be determined based on user operation or automatically when the user performs the user registration with the second platform 20. The second user is able to log in to the second platform 20 using the normal ID and the password.

The second game data includes any information about each second game played by a user. For example, the second game data may include save data of the second game played by the user. For example, the second game interrupted in the past can be resumed using the second game data.

The second virtual currency is a virtual currency on the second platform 20 possessed by the second user who has acquired the second account through the user registration. The second virtual currency is used by the second user when he/she uses the various functions of the second platform 20. For example, the second user may be able to consume the second virtual currency to obtain a game content such as an item or a character in the second game. In the embodiment, the second user who has acquired the second account through the authentication and connection process may be able to use the function(s) of the first platform 10 by consuming the second virtual currency when he/she wishes to use the function(s) of the first platform 10.

The information stored in the second server storage unit 211 is not limited to the above examples. The second server storage unit 211 may further store any information used for operations of the second server device 21. For example, the second server storage unit 211 may further store identification information of each second game and identification information of each first game provided to the second user who has acquired the first account through the authentication and connection process. The identification information of a game is stored in the second server storage unit 211, for example, when the provider of the game performs application registration (delivery registering) of the game to the second platform 20.

Figure 4:
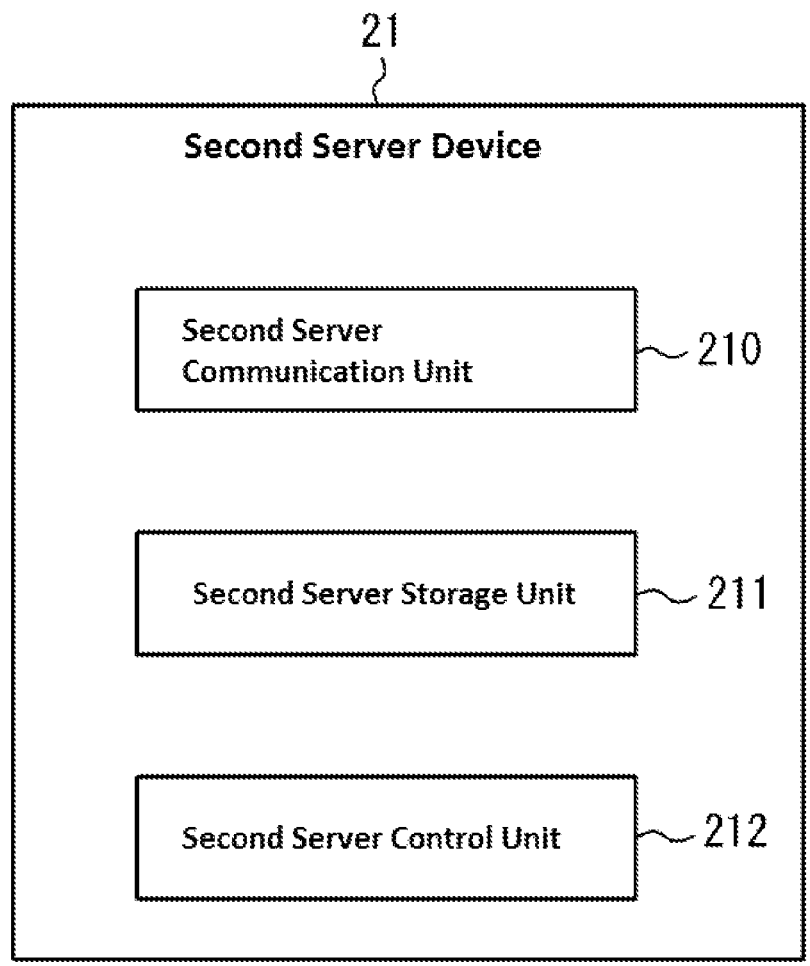
FIG. 4 is a block diagram schematically showing the configuration of a second server device.

The second server control unit 212 shown in FIG. 4 includes one or more processors. The second server control unit 212 controls operations of the second server device 21 as a whole. The operation of the second server device 21 controlled by the second server control unit 212 will be described later.

Configuration of Terminal Device

The configuration of the second server device 30 will be now specifically described with reference to FIG. 1. The terminal device 30 includes a terminal communication unit 31, a terminal storage unit 32, a display unit 33, an input unit 34, and a terminal control unit 35.

The terminal communication unit 31 includes an interface that communicates with an external device in a wired or wireless manner and transmits and receives information. The terminal communication unit 31 may include a wireless communication module that conforms with a mobile communication standard such as Long Term Evolution (LTE) (registered trademark), a wireless LAN communication module, a wired LAN communication module, or the like. The terminal communication unit 31 is communicably connected with the network 40.

The terminal storage unit 32 includes one or more memory units. Each memory unit included in the terminal storage unit 32 may serves as, for example, a primary storage, a secondary storage, or a cache memory. The terminal storage unit 32 may be built in the terminal device 30 or may be connected to the terminal device 30 via an interface. The terminal storage unit 32 stores information and programs used for operation of the terminal device 30.

For example, the terminal storage unit 32 stores an application(s) that is allowed to use the functions of the first platform 10 and the second platform 20. In the embodiment, the application is a general-purpose web browser. The user is able to use the functions of the first platform 10 and the second platform 20 on the applications. For example, the first game and the second game may be browser games executed via a web browser. The browser games are executed by the server and the terminal device working in cooperation. For example, detection of user operations and display of the information are executed on the terminal device, and processing of the game is executed on the server. However, the application is not limited to a general-purpose web browser, for example, an application dedicated to the first platform 10 and an application dedicated to the second platform 20 may be used.

The information stored in the terminal storage unit 32 is not limited to the above examples. The terminal storage unit 32 may further store any information used for operations of the terminal device 30.

The display unit 33 may include a display device such as a liquid crystal display and an organic EL display. The display unit 33 is capable of displaying various screens.

The input unit 34 includes any input interface that receives a user operation. The input interface may include, for example, a pointing device such as a mouse, a physical key, a touch panel integrally provided with the display unit 33, and the like.

The terminal control unit 35 includes one or more processors. The terminal control unit 35 controls operations of the terminal device 30 as a whole. The operation of the terminal device 30 controlled by the terminal control unit 35 will be described later.

Operation of Information Processing System

A first operation of the information processing system 1 will be now described. In brief, the first operation includes an operation to create the first account through the authentication and connection process for the second user having the second account.

The terminal device 30 activates, for example, a general-purpose web browser application and logs in to the second platform 20 using information concerning the second account (for example, the user ID and the password). Using the information received from the second server device 21, the terminal device 30 displays a screen on which a plurality of games are selectably shown. The plurality of games may include one or more second games and one or more first games. For example, the screen 2_1 shown in FIG. 6 includes three game buttons 500 to 502 and a second footer area 503.

The second footer area 503 is an area that may be displayed, for example, in a lower part of the screen while the terminal device 30 accesses the second platform 20. In the second footer area 503, any information concerning the second platform 20 may be selectably displayed. More specifically, the second server device 20 transmits information that is to be displayed on the second footer area 503 to the terminal device 30 in response to the access from the terminal device 30. The terminal device 30 displays the information such that the information is selectable. For example, in the second footer area 503, a link to terms of use of the second platform 20, a link to a screen concerning the second user (for example, My page etc.) and the like may be displayed.

Each of the game buttons 500 to 502 is a GUI (Graphical User Interface) that accepts a user operation to start a corresponding game. Upon receiving the user operation on the game buttons 500, 501, or 502, the terminal device 30 transmits a request to start the corresponding game.

For example, the two game buttons 500 and 501 correspond to the second games A2 and B2 provided by the second platform 20, respectively. Upon receiving a user operation on the game button 500 or 501, the terminal device 30 transmits a request to start a corresponding second game to the second server device 21. The second server device 21 provides the second game to the second user using the information concerning the second account of the second user (for example, the user ID). More specifically, when the second game data of the second game corresponding to the user ID of the second user is stored in the second server storage unit 211, the second server device 21 read outs the second game data. The second server device 21 transmits an instruction to start the second game to the terminal device 30. The start instruction may include any information used for execution of the second game. The terminal device 30 starts the second game according to the start instruction.

The second server device 21 may execute processing based on the start of the second game. Such a processing may includes, but are not limited to, associating the second user with the second game (for example, registering the second game in the "My Game" of the second user), associating the second user with an official account of the second game (for example, registering the official account of the second game in a "friend" list of the second user), configuring distribution of information on the second game (for example, notification relating to the second game etc.) and the like.

The terminal device 30 cooperates with the second server device 21 to proceed with the second game. In accordance with the progress of the second game, the second server device 21 stores or updates the second game data of the second game in the second server storage unit 211 in association with the user ID of the second user.

Figure 7:
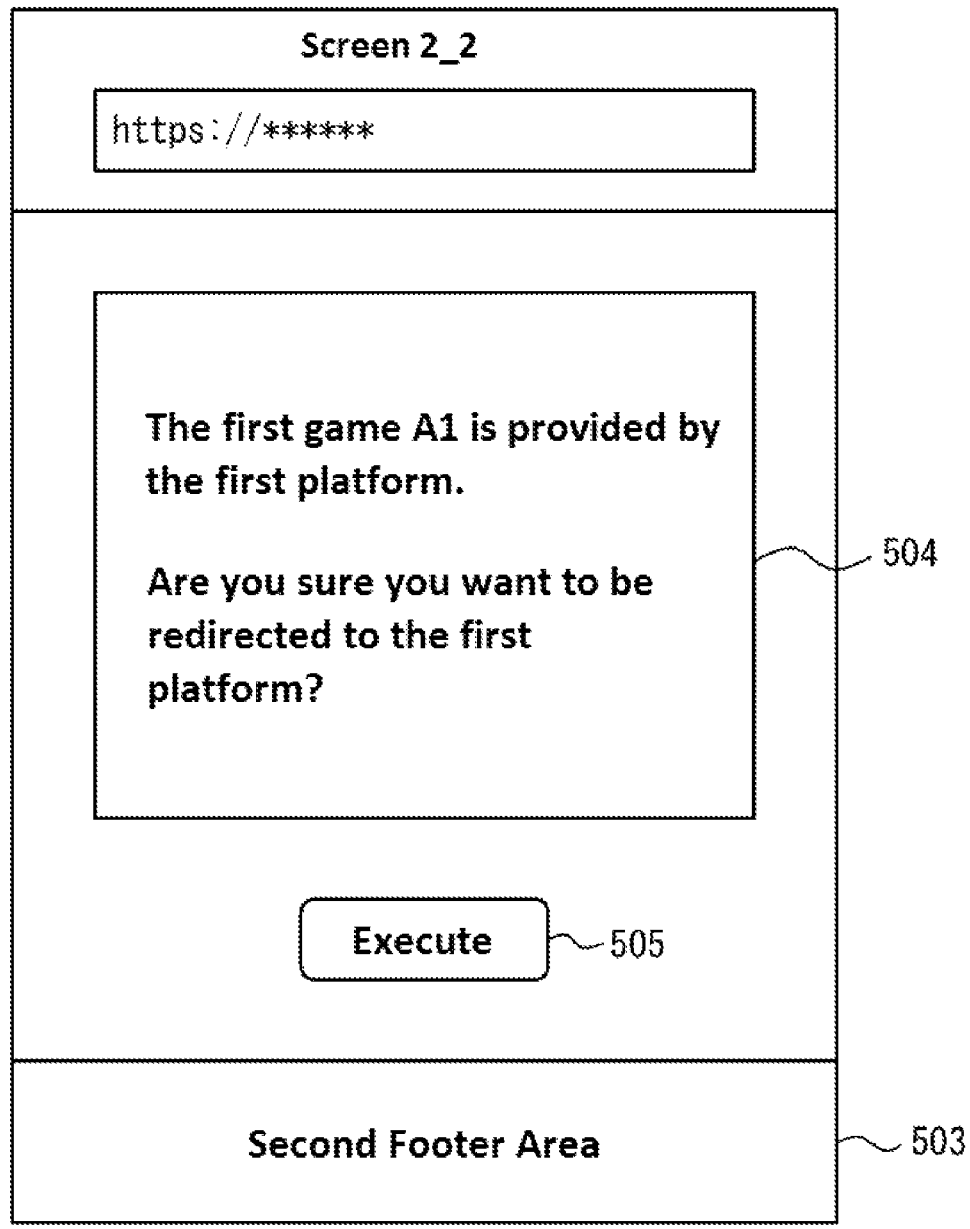
FIG. 7 shows an example of a screen displayed by the terminal device.

Whereas the game button 502 corresponds to a first game A1 provided by the first platform 10. Upon receiving a user's operation on the game button 502, the terminal device 30 displays a screen for allowing the user to confirm that the game is provided by the first game A1. For example, the screen 2_2 shown in FIG. 7 includes a second footer area 503, a message 504, and an execute button 505.

Figure 6:
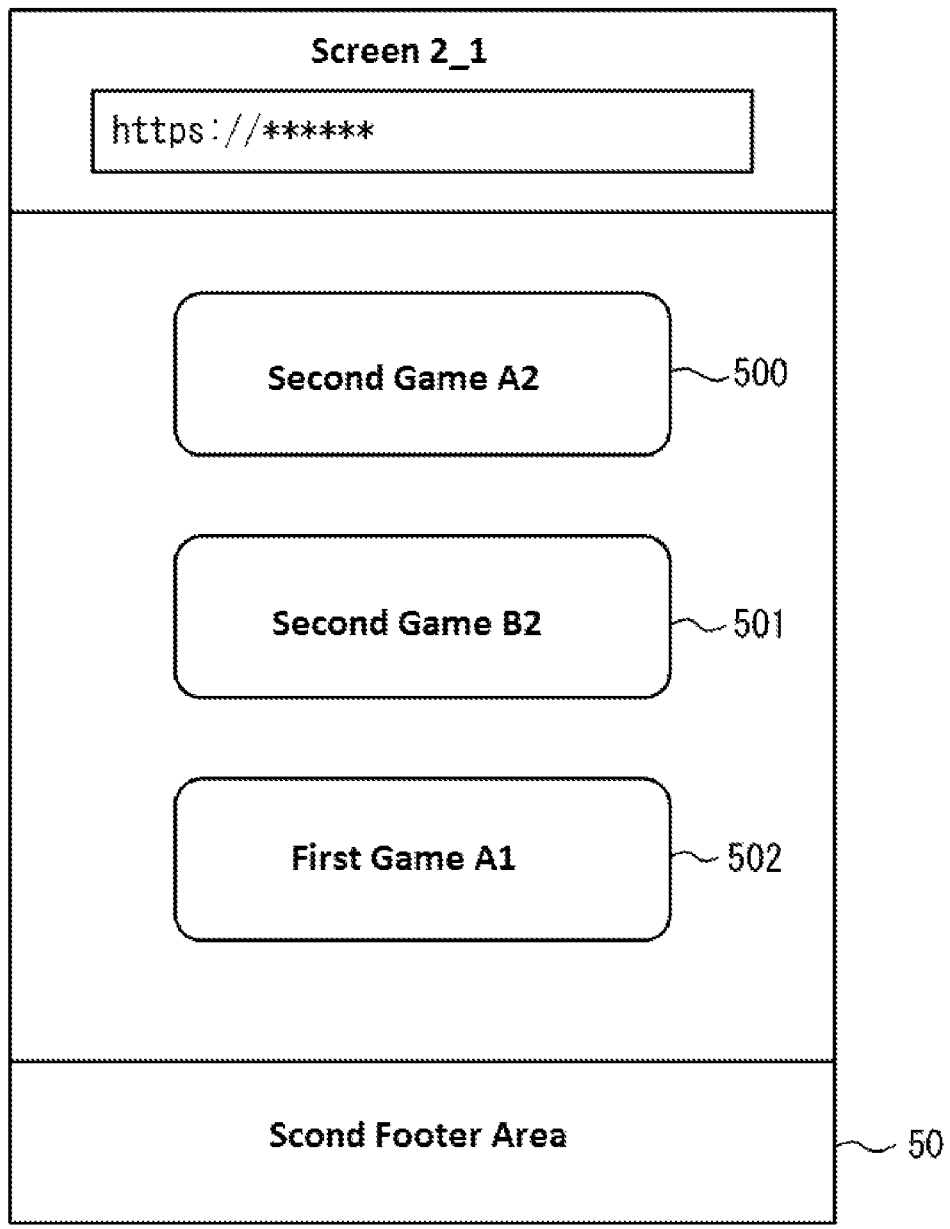
FIG. 6 shows an example of a screen displayed by a terminal device.

The second footer area 503 is the same as the second footer area 503 of the screen 2_1 shown in FIG. 6. The message 504 is a message for allowing the user to confirm that the provider of the first game A1 is the first platform 10 and that the user is going to access the first platform 10 to start the first game A1. However, the content of the message 504 is not limited to this.

The execution button 505 is a GUI for accepting a user operation to start the first game A1. Upon receiving the user operation on the execution button 505, the terminal device 30 transmits a start request of the first game A1 to the second server device 21. The second server device 21 redirects the terminal device 30 to the first server device 11. The first server device 11 determines whether a valid login session with the terminal device 30 exists.

More specifically, the first server device 11 determines that the valid login session exists when session data indicating that the second user of the terminal device 30 has logged in to the first platform 10 using the above-described specific ID is stored in the first server storage unit 111. In this case, the first server device 11 provides the second user with the first game A1 using the specific ID of the second user, which will be described later. Specifically, the first server device 11 specifies the first game data of the first game A1 corresponding to the specific ID of the second user. The first server device 11 transmits an instruction to start the first game A1 to the terminal device 30 using the specified first game data. The start instruction may include any information used for execution of the first game A1. The terminal device 30 starts the first game A1 in accordance with the start instruction.

On the other hand, when the session data is not stored in the first server storage unit 111, the first server device 11 determines that no valid login session exists. In this case, the first server device 11 redirects the terminal device 30 to the second server device 21 in order to perform the authentication and connection process. The second server device 21 determines whether there is a valid login session with the terminal device 30.

When it is determined that the valid login session exists, the second server device 21 generates an authenticated ID. The authenticated ID may be, for example, an ID token. The ID token may include information such as an identifier of the first platform 10, an identifier of the second platform 20, an identifier of the second user, and date and time when the ID token is created. The second server device 21 transmits the authenticated ID to the terminal device 30 and redirects the terminal device 30 to the first server device 11. When the redirection is performed, the terminal device 30 transmits the authenticated ID to the first server device 11.

On the other hand, when it is determined that there is no valid login session, the second server device 21 transmits an instruction to display an authentication screen, which will be described later, to the terminal device 30. The terminal device 30 displays the authentication screen based on the display instruction.

Figure 8:
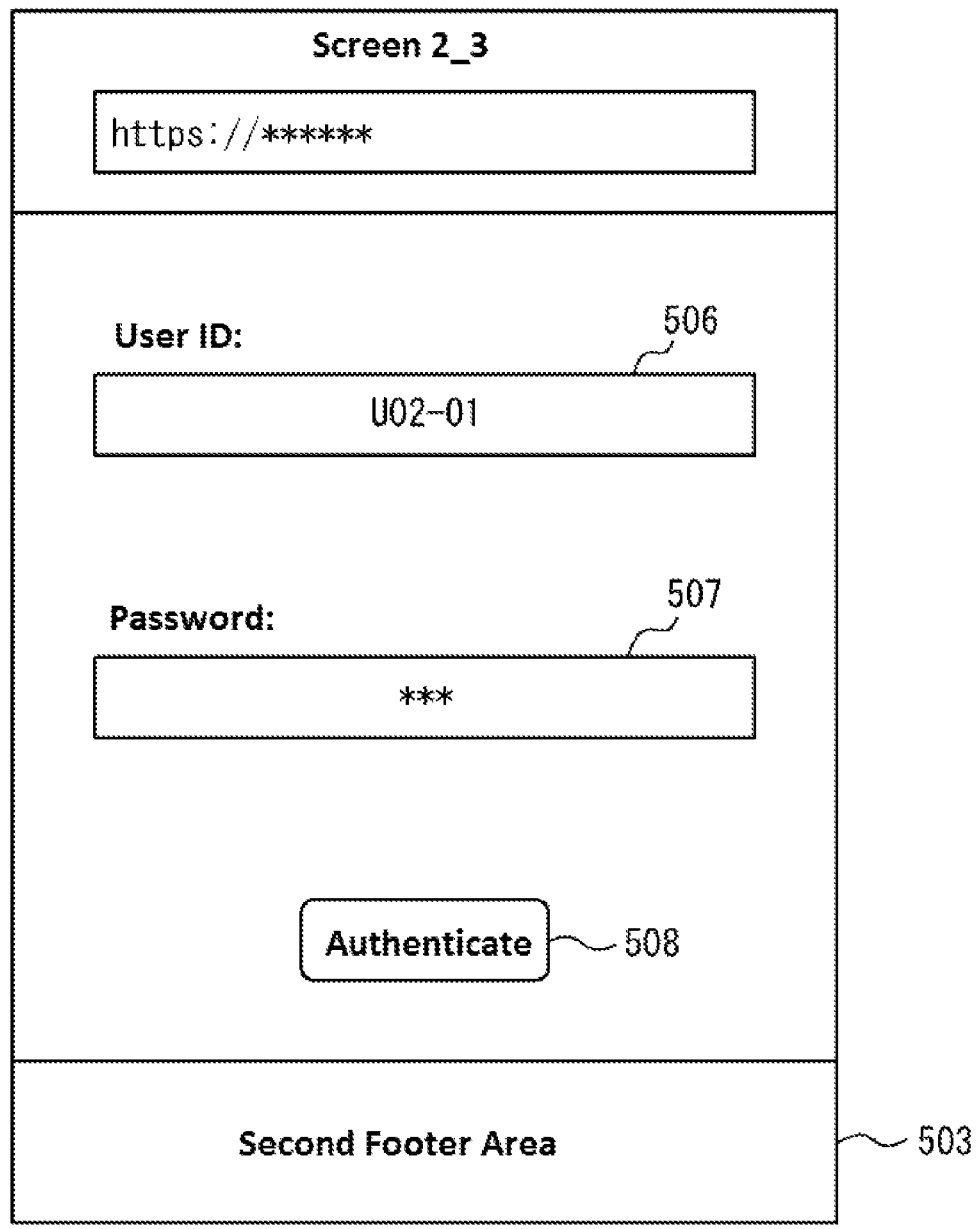
FIG. 8 shows an example of a screen displayed by the terminal device.

The authentication screen is a screen for accepting input of, for example, information relating to the second account of the second user (for example, the user ID and password). For example, the screen 2_3 shown in FIG. 8 is one example of the authentication screen. The screen 2_3 includes the second footer area 503, a first input form 506, a second input form 507, and an authentication button 508.

The second footer area 503 is the same as the second footer area 503 of the screen 2_1 shown in FIG. 6. The first input form 506 receives an input of the user ID among the information concerning the second account. The second input form 507 receives an input of the password among the information concerning the second account. The authentication button 508 is a GUI for accepting an user's operation to perform user authentication. Upon receiving the user's operation on the authentication button 508, the terminal device 30 transmits, to the second server device 21, a user authentication request including the user IDs and the passwords respectively filled out in the first input form 506 and the second input form 507.

Upon receiving the user authentication request, the second server device 21 generates an authenticated ID using the information concerning the second account. Specifically, when the user ID and the password contained in the user authentication request match respectively the user ID and the password of the second user stored in the second server storage unit 211, the second server device 21 generates the authenticated ID. The second server device 21 transmits the authenticated ID to the terminal device 30 and redirects the terminal device 30 to the first server device 11. When the redirection is performed, the terminal device 30 transmits the authenticated ID to the first server device 11.

The first server device 11 receives the authenticated ID via the terminal device 30. Using the received authenticated ID, the first server device 11 determines whether the second user has the first account that has been created through the authentication and connection process.

More specifically, when the user ID corresponding to the authenticated ID, that is, the specific ID is stored in the first server storage unit 111, the first server 11 determines that the second user has the first account acquired through the authentication and connection process. In this case, the first server device 11 provides the second user with the first game A1 using the specific ID of the second user. Specifically, the first server device 11 specifies the first game data of the first game A1 corresponding to the specific ID of the second user. The first server device 11 transmits an instruction to start the first game A1 to the terminal device 30 using the specified first game data. The start instruction may include any information used for execution of the first game A1. The terminal device 30 starts the first game A1 according to the start instruction.

On the other hand, when the user ID corresponding to the authenticated ID is not stored in the first server storage unit 111, the first server 11 determines that the second user does not have the first account acquired through the authentication and connection process. In this case, the first server device 11 transmits, to the terminal device 30, an instruction to display a consent screen which will be described later. The terminal device 30 displays the consent screen based on the display instruction.

Figure 9:
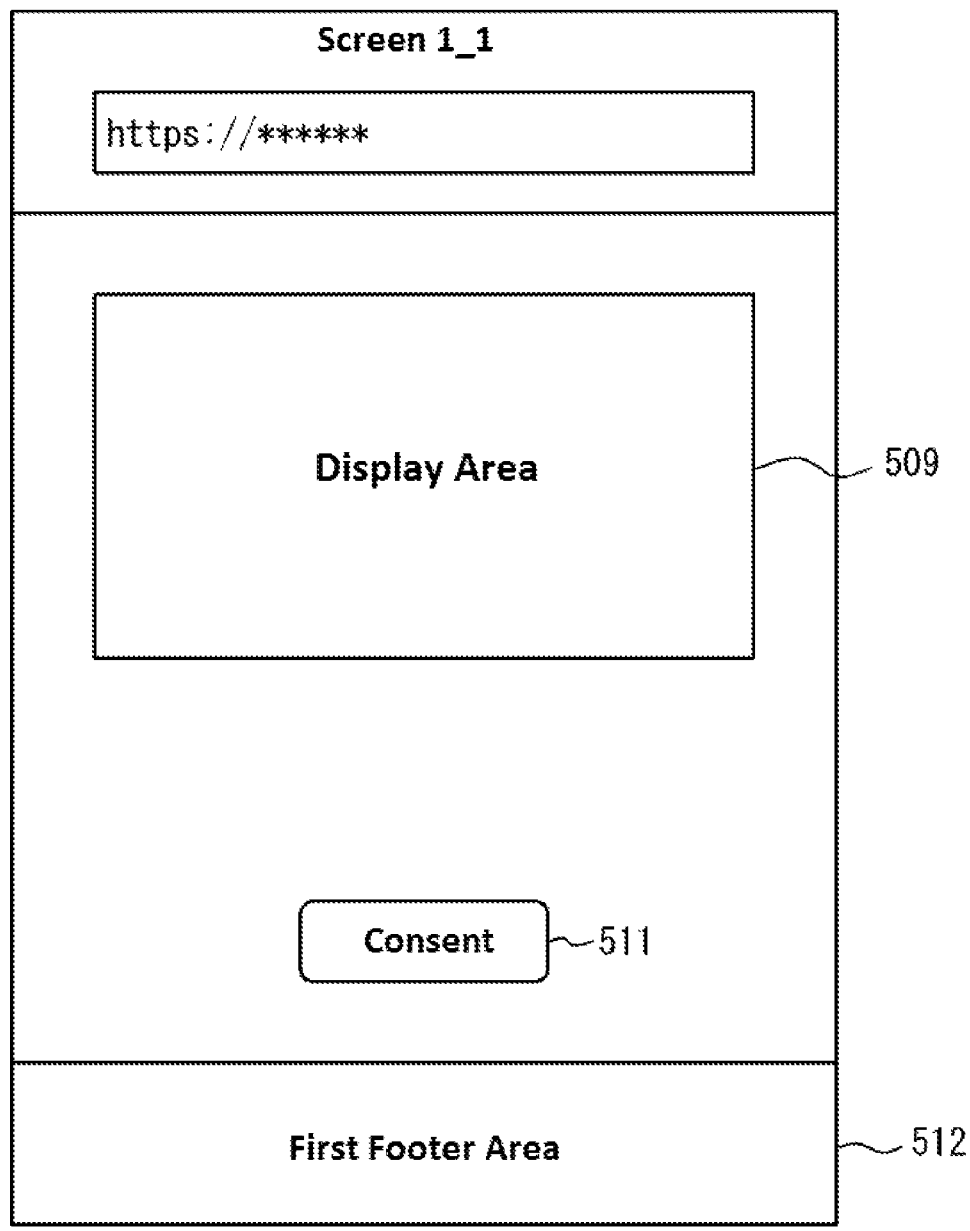
FIG. 9 shows an example of a screen displayed by the terminal device.

The consent screen is a screen for asking the second user's consent to the terms of use of the first platform 10. For example, the screen 1_1 shown in FIG. 9 is an example of the consent screen. The screen 1_1 includes a display area 509, a consent button 511, and a first footer area 512.

The first footer area 512 is an area that may be displayed, for example, in a lower part of the screen while the terminal device 30 accesses the first platform 10. In the first footer area 512 of the screen 1_1, any information concerning at least one of the first plat form 10 or the second platform 20 may be selectably displayed. More specifically, the first server device 11 transmits information that is to be displayed on the first footer area 512 to the terminal device 30 in response to the access from the terminal device 30. The terminal device 30 displays the information such that the information is selectable. For example, in the first footer area 512 of the screen 1_1, a link to terms of use of the first platform 10, a link to a screen concerning the second user (for example, My page etc.), and information about the second game (for example, an image of the second game, and a link for starting the second game) and the like may be displayed. A specific example of behavior when the information displayed in the first footer area 512 is selected based on a user operation will be described later. The first footer area 512 may be provided for each of various screens displayed by the terminal device 30 based on the information retrieved from the first server device 11. In the display area 509, any information concerning the first platform 10 may be displayed. For example, the terms of use of the first platform 10 or a link to the terms of use, a message asking the user's consent to the terms of use and the like may be displayed in the display area 509.

Here, the contents of the terms of use for the second user may be different from the contents of the terms of use for the first user who has acquire the first account through the normal user registration. For example, the terms of use for the second user may describe that the second user is able to play only some of the plurality of first games provided by the first platform 10, and that the content of the user information provided to the first platform is different from that of the first user.

The consent button 511 is a GUI for accepting a user operation to agree to the terms of use of the first platform 10. Upon receiving the user's operation on the consent button 511, the terminal device 30 notifies the first server device 11 that the second user has agreed to the terms of use of the first platform 10.

In response to the notification by the terminal device 30 that the second user has agreed to the terms of use of the first platform 10, the first server device 11 generates a specific ID. The first server device 11 associates the authenticated ID and the specific ID and stores them in the first server storage unit 111 as the information concerning the first account. By storing the authenticated ID and the specific ID in association with each other, the first account created through the authentication and connection process is given to the second user. The first server device 11 allows the second user to log in to the first platform 10 using the specific ID and the authenticated ID.

Figure 10:
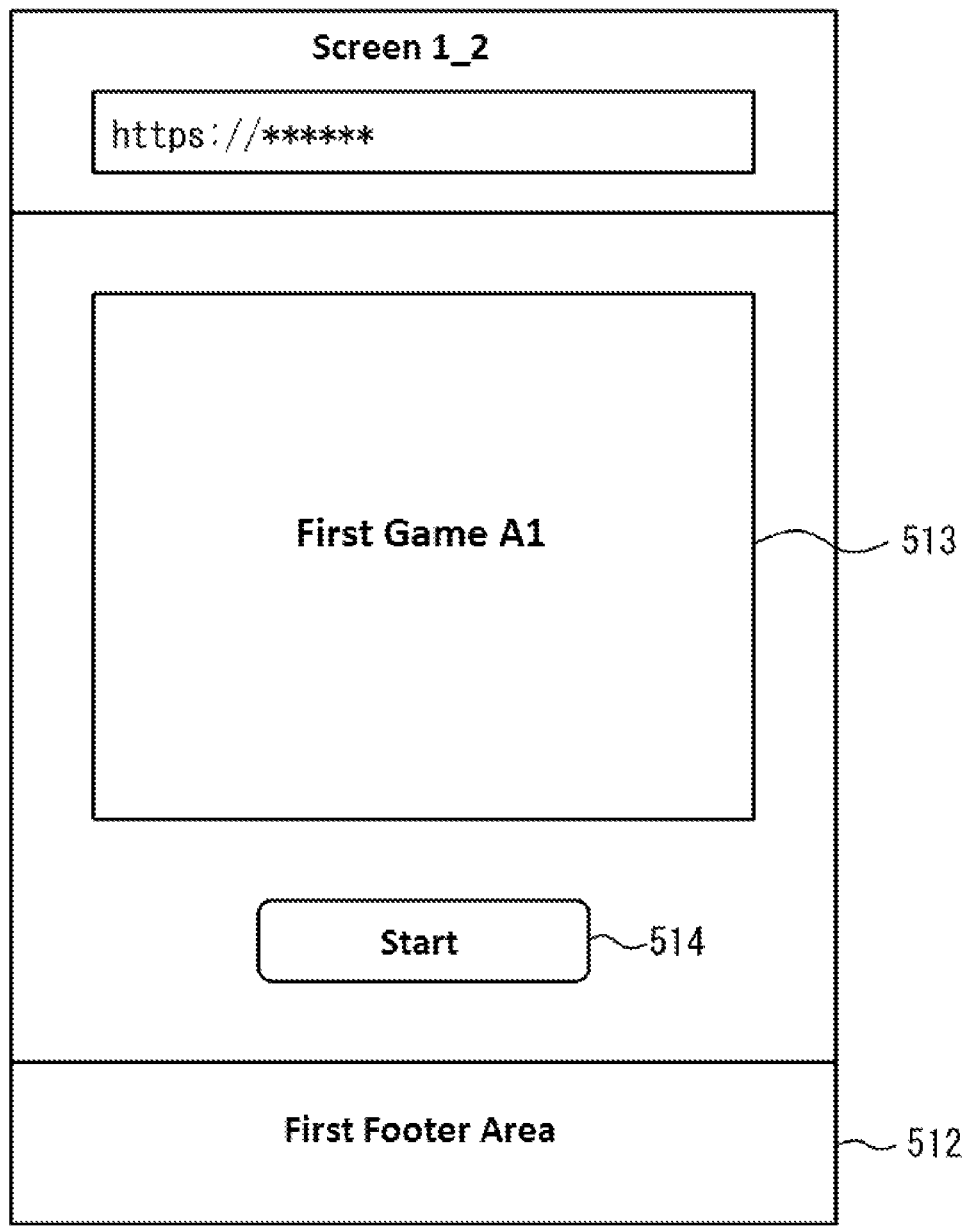
FIG. 10 shows an example of a screen displayed by the terminal device.

The first server device 11 provides the second user with the first game A1 using the specific ID. More specifically, the first server device 11 transmits, to the terminal device 30, an instruction to display a start screen of the first game A1. The display instruction may include any information used for displaying the start screen. The terminal device 30 displays the start screen of the first game A1. For example, the screen 1_2 shown in FIG. 10 is an example of the start screen. The screen 1_2 includes a title image 513, a start button 514, and the first footer area 512. In the first footer area 512 of the screen 1_2, any information concerning the second platform 20 may be selectably displayed. For example, the first footer area 512 of the screen 1_2 may have a configuration similar to the above-described second footer area 503. In the first footer area 512 of the screen 1_2, for example, other than the link to the first game or function(s) that can be provided to the second user, information relating to the first platform 10 may not be displayed. The title image 513 is an image showing the title of the first game A1 and so on. The start button 514 is a GUI for accepting a user operation to start the first game A1. Upon receiving the user operation on the start button 514, the terminal device 30 starts the first game A1.

The first server device 11 may execute processing based on the start of the first game. Such a processing may includes, but are not limited to, associating the second user with the first game (for example, registering the first game in the "My Game" of the second user), associating the second user with an official account of the first game (for example, registering the official account of the first game in a "friend" list of the second user), configuring distribution of information on the first game (for example, notification relating to the first game etc.) and the like.

The terminal device 30 cooperates with the first server device 11 to proceed with the first game A1. For example, any information used for advancement of the first game A1 may be transmitted and received between the terminal device 30 and the first server device 11. In accordance with the progress of the first game A1, the first server device 11 stores or updates the first game data of the first game A1 in the first server storage unit 111 in association with the user ID of the second user.

According to the above-described first operation of the information processing system 1, the second user using the second platform 20 acquires the first account through the authentication and connection process, whereby the second user is able to use the functions of the first platform without performing the normal user registration to the first platform 10. In this way, it is possible to diversify the services provided to the second user registered in the second platform 20. Further, the second user can acquire the first account through a simpler procedure than, for example, that of the normal user registration to the first platform 10.

A second operation of the information processing system 1 will be now described. In brief, the second operation includes an operation of imparting a user a game content usable in the first game by consuming the first virtual currency or the second virtual currency possessed by the user of the terminal device 30.

Figure 11:
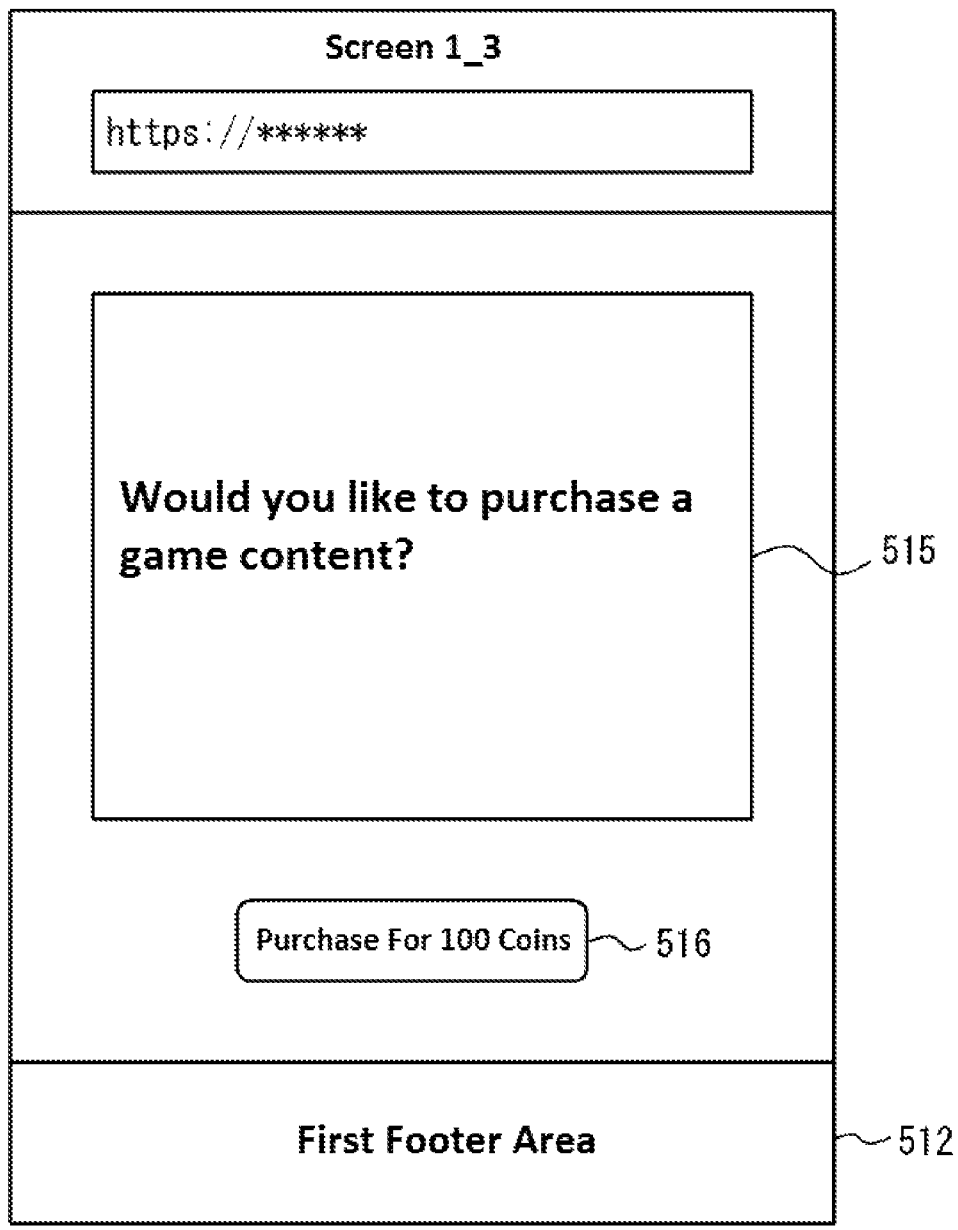
FIG. 11 shows an example of a screen displayed by the terminal device.

While the first game is executed, the terminal device 30 displays a purchase screen for allowing the user to purchase a game content(s) usable in the first game. For example, the screen 1_3 shown in FIG. 11 is an example of the purchase screen. The screen 1_3 includes a message 515, a first purchase button 516, and the first footer area 512.

When a user of the terminal device 30 is the second user, any information concerning the second platform 20 may be selectably displayed in the first footer area 512 of the screen 1_3. For example, the first footer area 512 of the screen 1_3 may have a configuration similar to the above-described second footer area 503. In the first footer area 512 of the screen 1_3, for example, other than the link to the first game or function(s) that can be provided to the second user, information relating to the first platform 10 may not be displayed. Whereas when the user of the terminal device 30 is the first user, any information concerning the first platform 10 may be selectably displayed in the first footer area 512 of the screen 1_3. For example, in the first footer area 512, a link to terms of use of the first platform 10, a link to a screen concerning the first user (for example, My page etc.) and the like may be displayed.

The message 515 is, for example, a message for allowing the user to confirm the purchase of a game content, but the content of the message 515 is not limited thereto. The first purchase button 516 is a GUI for accepting a user operation for proceeding with a game content purchase procedure. A price of the game content may be shown on the first purchase button 516. The price may be shown in a unit different from any one of the first virtual currency and the second virtual currency (for example, a unit of "coin").

Upon receiving the user operation on the first purchase button 516, the terminal device 30 transmits a request to purchase the game content to the first server device 11. The first server device 11 determines whether the user of the terminal device 30 that transmitted the purchase request is the first user or the second user.

When the user of the terminal device 30 is the first user, the first server device 11 executes at least a part of a payment process using the first virtual currency possessed by the first user and then imparts the game content to the first user. When the first server device 11 executes only a part of the payment process, the remaining part may be executed by any external device such as a payment processing server. More specifically, the first server device 11 reduces the amount of the first virtual currency of the first user, and updates the first game data of the first user such that the game content is imparted to the first user in the first game.

Whereas when the user of the terminal device 30 is the second user, the first server device 11 transmits, to the terminal device 30, the authenticated ID of the second user or the user ID included in the information concerning the second account and identification information of the first game related to the game content that the second user intends to purchase in order to execute the payment process using the second virtual currency of the second user. The first server device 11 further redirects the terminal device 30 to the second server device 21. When the redirection is performed, the terminal device 30 transmits the authenticated ID or the user ID and the identification information of the first game to the first server device 21. The second server device 21 determines whether the identification information of the first game received from the first server device 11 via the terminal device 30 is stored in the second server storage unit 211.

When it is determined that the identification information of the first game is not stored, the second server device 21, for example, determines that the purchase request by the second user is not an authorized and stops the payment process.

On the other hand, when it is determined that the identification information of the first game is stored, the second server device 21 further determines whether the authenticated ID or the user ID received from the first server device 11 via the terminal device 30 is identical to the authenticated ID or user ID of the login session between the terminal device 30 and the second server device 21.

When it is determined that they are not identical from each other, the second server device 21 may, for example, determine that the purchase request by the second user is not authorized and may stops the payment process. Alternatively, the second server device 21 may prompt the terminal device 30 to log in again to the second platform 20 with the information concerning the second account.

Figure 12:
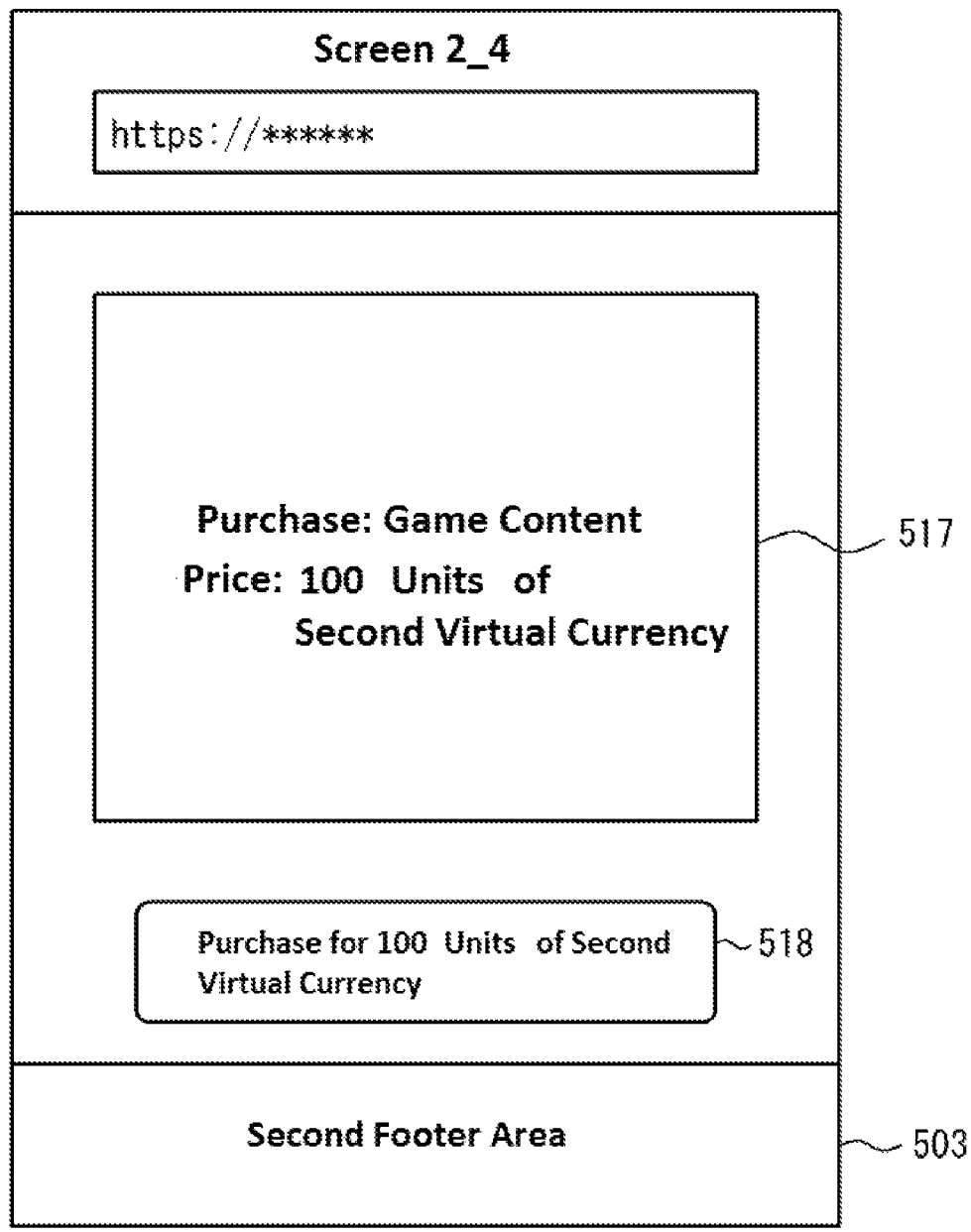
FIG. 12 shows an example of a screen displayed by the terminal device.

On the other hand, when it is determined that they are identical to each other or when the second user logs in again, the second server 21 transmits, to the terminal device 30, an instruction to display the screen on which the second user can confirm the execution of the payment process using the second virtual currency possessed by the second user. The terminal device 30 displays the screen in accordance with the display instruction. For example, the screen 2_4 shown in FIG. 12 is an example of the screen. The screen 2_4 includes a message 517, a second purchase button 518, and the second footer area 503.

The second footer area 503 is the same as the second footer area 503 of the screen 2_1 shown in FIG. 6. The message 517 is, for example, a message indicating, for example, a name of the game content to be purchased and the price of the game content, but the content of the message 517 is not limited thereto. The second purchase button 518 is a GUI for receiving a user operation for transmitting an execution request of the payment process using the second virtual currency. The price of the game content may be displayed in units of the second virtual currency on the second purchase button 518.

Upon receiving the user operation on the second purchase button 518, the terminal device 30 transmits, to the second server device 21, a request to execute the payment process using the second virtual currency. In response to the execution request, the second server device 21 executes at least a part of the payment process using the second virtual currency. When the second server device 21 executes only a part of the payment process, the remaining part may be executed by any external device such as a payment processing server. Specifically, the second server device 21 reduces the amount of the second virtual currency of the second user. The second server device 21 redirects the terminal device 30 to the first server device 11. The first server device 11 provides the second user with the game content. Specifically, the first server device 11 updates the first game data of the second user such that the game content is given to the second user in the first game.

Figure 13:
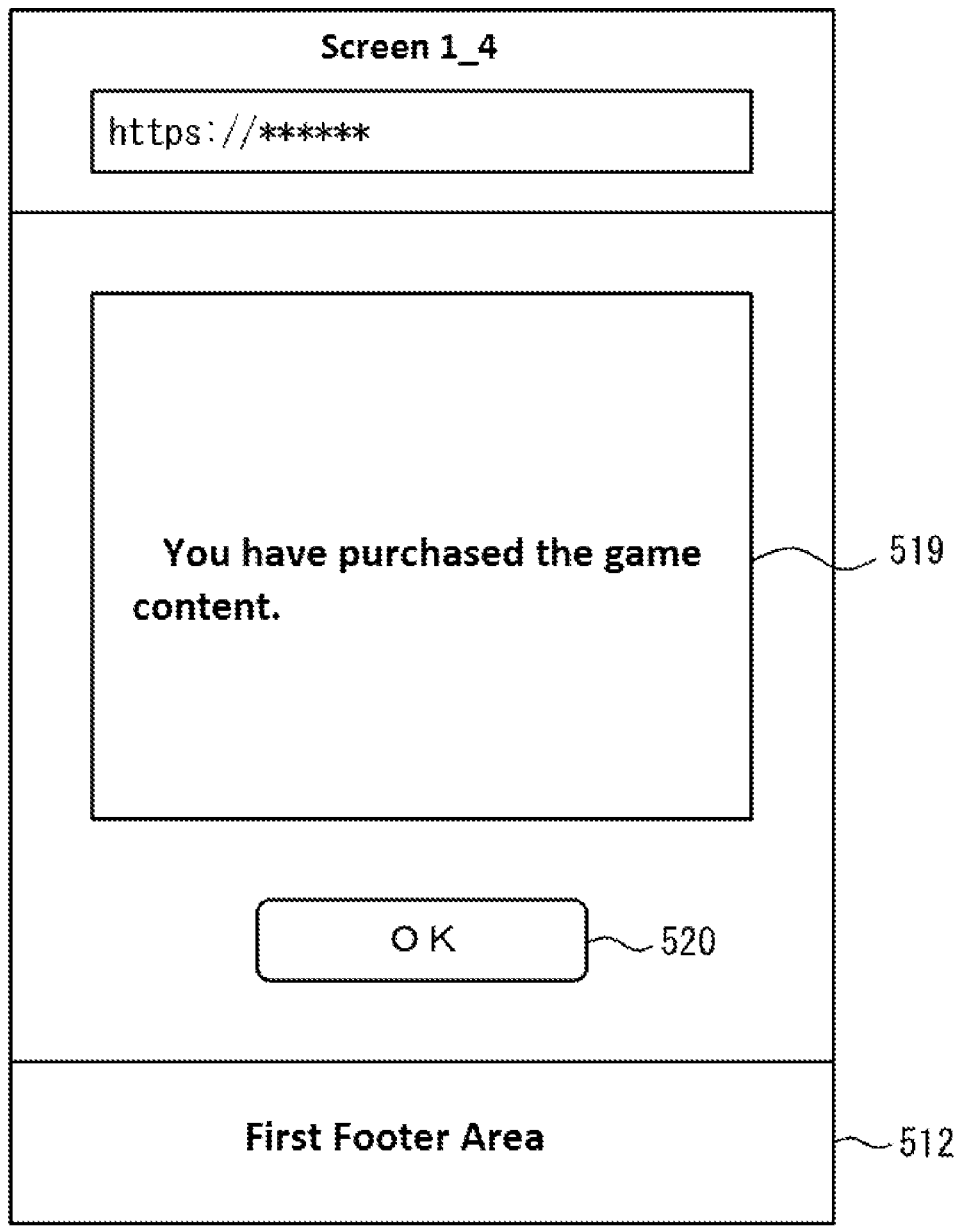
FIG. 13 shows an example of a screen displayed by the terminal device.

The first server device 11 may transmit an instruction to display a completion screen indicating that the first game content has been imparted to the terminal device 30. The terminal device 30 displays the completion screen in accordance with the display instruction. For example, the screen 1_4 shown in FIG. 13 is an example of the completion screen. The screen 1_4 includes a message 519, an OK button 520, and the first footer area 512. In the first footer area 512 of the screen 1_4, any information concerning the second platform 20 is displayed such that the user is able to select the information. For example, the first footer area 512 of the screen 1_2 may have a configuration similar to the above-described second footer area 503. In the first footer area 512 of the screen 1_4, for example, other than the link to the first game or function(s) that can be provided to the second user, information relating to the first platform 10 may not be displayed. The message 519 is, for example, a message indicating that the game content has been given to the second user, but the content of the message 519 is not limited thereto. The OK button 520 is a GUI for accepting a user operation to resume the first game. Upon receiving the user operation on the OK button 520, the terminal device 30 resumes the first game A1 in cooperation with the first server device 1.

According to the above-described first operation of the information processing system 1, when the second user who has the first account obtained through the authentication and connection process purchases a game content usable in the first game, the payment process is performed using not the first virtual currency managed by the first plat form 10 but the second virtual currency managed by the second platform 20. With this configuration, for example, occurrence of inconveniences described below can be reduced.

For example, if the second user who has acquired the first account through the authentication and connection process is allowed to purchase a game content usable in the first game of the first platform 10 with the first virtual currency managed by the first platform 10, income of the administrator of the second platform 20 may be reduced. For this reason, the administrator of the second platform 20 may not be able to positively make the first game of the first platform 10 available to the second user. On the other hand, according to the embodiment, when the second user purchases a game content usable in the first game, the second user is able to purchase the game content using the second virtual currency managed by the second platform 20. This reduces the chance of unfavorable situations where the income of the administrator of the second platform 20 decreases and the like.

A third operation of the information processing system 1 will be now described. In brief, the third operation includes ending the first game and starting the second game when the second user who has the first account acquired through the authentication and connection process is playing the first game.

When the terminal device 30 of the second user receives a user operation on, for example, the information about the second game selectably displayed in the above-described first footer area 512 (for example, the link for starting the second game) during the execution of the first game, the terminal device 30 transmits a request to start the second game to the first server device 11. The first server device 11 redirects the terminal device 30 to the second server device 21 in order to make the second game start in the terminal device 30.

The second server device 21 provides the second game to the second user using the information concerning the second account of the second user (for example, the user ID). More specifically, when the second game data of the second game corresponding to the user ID of the second user is stored in the second server storage unit 211, the second server device 21 read outs the second game data. The second server device 21 transmits an instruction to start the second game to the terminal device 30. The start instruction may include any information used for execution of the second game. The terminal device 30 starts the second game according to the start instruction. The terminal device 30 cooperates with the second server device 21 to proceed with the second game. In accordance with the progress of the second game, the second server device 21 stores or updates the second game data of the second game in the second server storage unit 211 in association with the user ID of the second user.

According to the above-described third operation of the information processing system 1, the second user having the first account acquired through the authentication and connection process is allowed to return to the second platform at any timing, for example, even during the play of the first game on the first platform 10. Here, it is possible to reduce the chance of unfavorable situations where users shift their interests from the second platform 20 to the first platform 10 if the information about the first platform 10 (for example, the link to the first game, function or the like provided only to the first user) is not displayed in the first footer area 512 similarly to the above-described first footer area 512 of the screen 1_2, 1_3 or 1_4.

Operation Flow of Information Processing System

The flow from the first to third operations of the information processing system 1 will be now described with reference to FIGS. 14 to 16.

Figure 14:
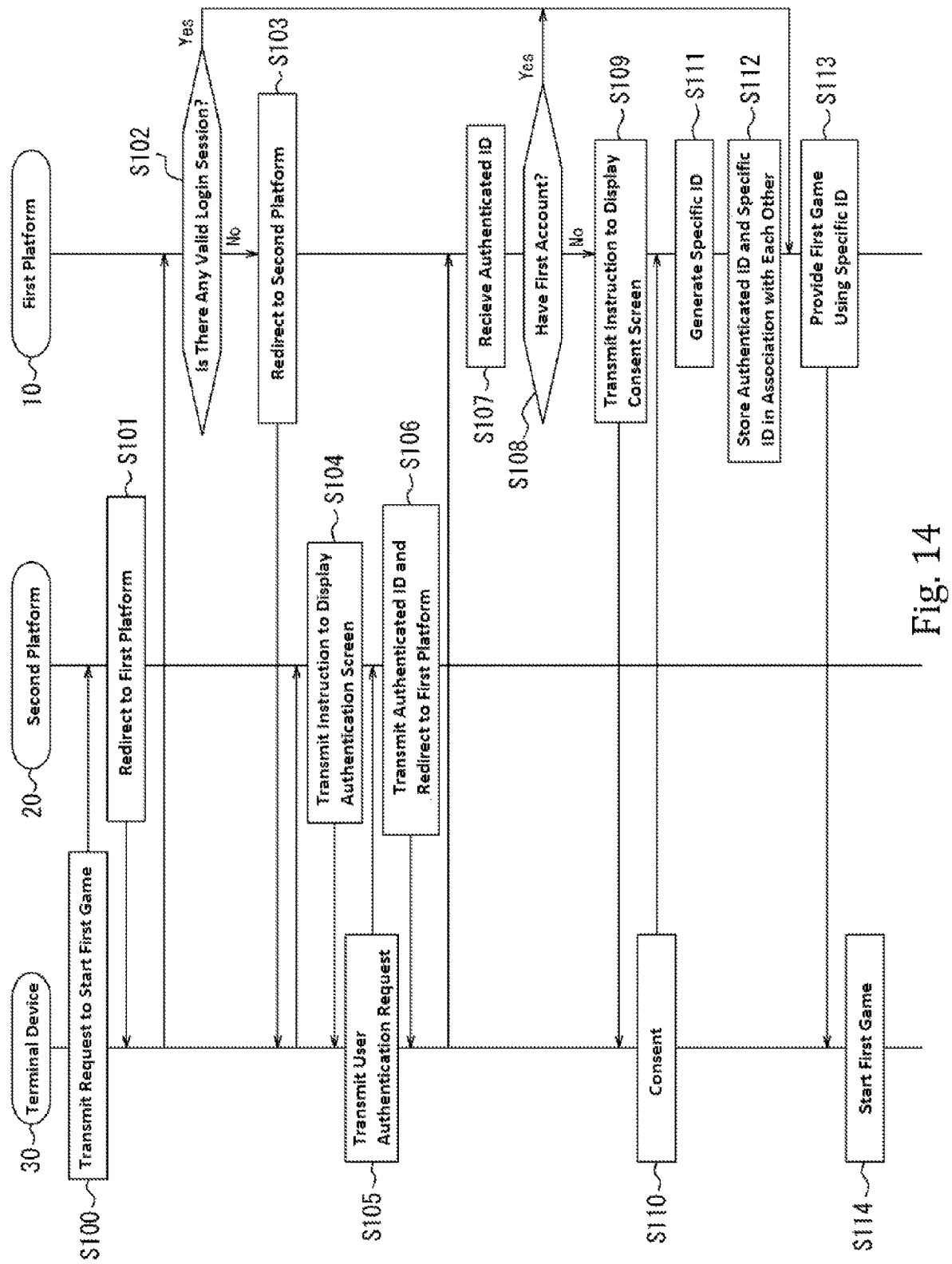
FIG. 14 is a sequence diagram showing a first operation of the information processing system.

FIG. 14 is a flow diagram of the first operation of the information processing system 1 described above. This flowchart is made on the premise that the second user is logged in to the second platform 20 using the terminal device 30.

Step S100: The terminal device 30 of the second user transmits the request to start the first game to the second platform 20.

Step S101: The second platform 20 redirects the terminal device 30 to the first platform 10.

Step S102: The first platform 10 determines whether there is a valid login session with the terminal device 30. When it is determined that there is a valid login session (Yes is step S102), the process proceeds to step S113. On the other hand, when it is determined that there is no valid login session (No in step S102), the process proceeds to step S103.

Step S103: The first platform 10 redirects the terminal device 30 to the second platform 20 in order to perform the authentication and connection process.

Step S104: The second platform 20 transmits an instruction to display the authentication screen to the terminal device 30.

Step S105: The terminal device 30 transmits the user authentication request including information about the second account (for example, the user ID and the password) to the second platform 20 in response to the user operation received on the authentication screen.

Step S106: Upon receiving the user authentication request, the second platform 20 generates the authenticated ID using the information about the second account. The second platform 20 transmits the authenticated ID to the terminal device 30 and redirects the terminal device 30 to the first platform 10. When the redirection is performed, the terminal device 30 transmits the authenticated ID to the first platform 10.

Step S107: The first platform 10 receives the authenticated ID.

Step S108: The first platform 10 uses the authenticated ID to determine whether the second user has the first account acquired through the authentication and connection process. When it is determined that the second user has the first account (Yes in step S108), the process proceeds to step S113. On the other hand, when it is determined that the second user does not have the first account (No in step S108), the process proceeds to step S109.

Step S104: The first platform 10 transmits the instruction to display the consent screen to the terminal device 30.

Step S110: The terminal device 30 notifies the first platform 10 that the second user agreed to the authentication and connection process based on the user operation received on the consent screen.

Step S111: When the first platform 10 is notified by the terminal device 30 that the second user has agreed to the authentication and connection process, the first platform 10 generates the specific ID.

Step S112: The first platform 10 associates the authenticated ID with the specific ID and stores them as the information concerning the first account.

Step S113: The first platform 10 provides the first game to the second user using the specific ID.

Step S114: The terminal device 30 initiates the first game in response to, for example, the user operation received on the start screen.

As described above, the operation of prompting the second user to input information concerning the second account via the authentication screen may be omitted. In this case, for example, steps S104 and S105 and the like may be appropriately omitted in the flowchart.

Figure 15:
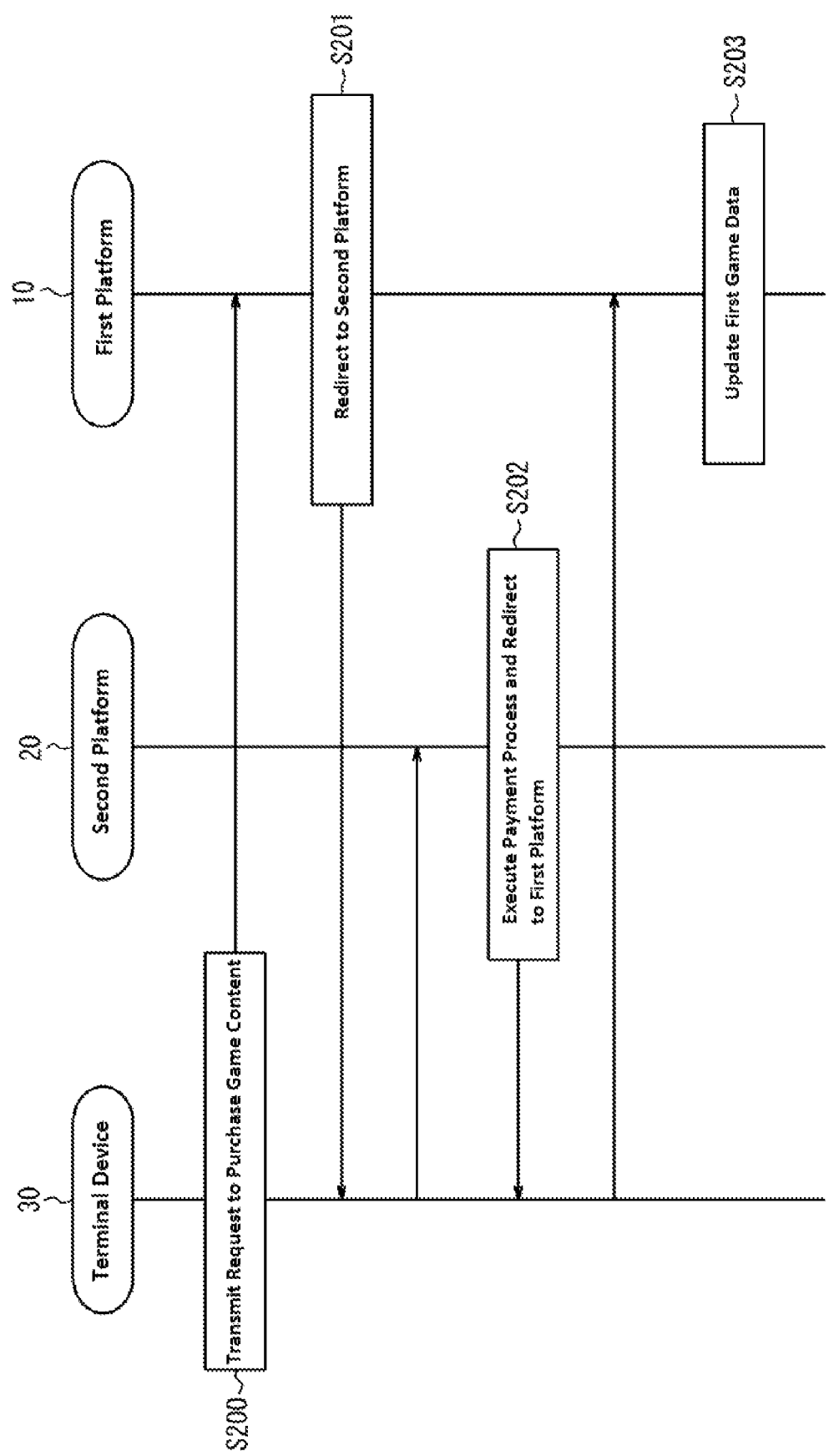
FIG. 15 is a sequence diagram showing a second operation of the information processing system.

FIG. 15 is a flow diagram of the second operation of the information processing system 1 described above. This flowchart is made on the premise that the second user having the first account acquired through the authentication and connection process logs in to the first platform 10 using the terminal device 30 and plays the first game.

Step S200: During the execution of the first game, the terminal device 30 transmits, to the first platform 10, the purchase request for a game content usable in the first game.

Step S201: The first platform 10 determines whether the user of the terminal device 30 that sent the purchase request is the first user or the second user. Here, it is determined that the user of the terminal device 30 is the second user. The first platform 10 redirects the terminal device 30 to the second platform 20.

Step S202: The second platform 20 executes at least a part of the payment process using the second virtual currency. The first platform 20 redirects the terminal device 30 to the first platform 10.

Step S203: The first platform 10 updates the first game data of the second user so as to give the second user the game content in the first game.

FIG. 16 is a flow diagram of the third operation of the information processing system 1 described above. This flowchart is made on the premise that the terminal device 30 of the second user having the first account acquired through the authentication and connection process displays the information about the second game (for example, a link for starting the second game) received from the first platform 10 such that the second user is able to select the information in, for example, the first footer area 512.

Step S300: When the information about the second game selectably displayed in the first footer region 512 on the screen is selected based on a user's operation, the terminal device 30 transmits the request to start the second game to the first platform 10.

Step S301: The first platform 10 redirects the terminal device 30 to the second platform 20 in order to start the second game in the terminal device 30.

Step S302: The second platform 20 provides the second game to the second user using the information concerning the second account of the second user (for example, the user ID).

Step S303: The terminal device 30 starts the second game in accordance with, for example, a user operation.

As described above, in the information processing system 1 according to the embodiment, the terminal device 30 of the second user transmits, to the first platform 10, the authenticated ID authenticated using the information about the second account of the second user. Upon receiving the authenticated ID, the first platform 10 generates the specific ID, stores the authenticated ID and the specific ID in association with each other, and provides the second user with the first game using the specific ID. Through above-described operations, the second user using the second platform 20 is able to use the various functions of the first platform 10 in addition to the various functions of the second platform 20. In this way, it is possible to diversify the services provided to the second user registered in the second platform 20.

Although the present disclosure has been described with reference to the accompanying drawings and embodiment, it should be noted that various changes and modifications can be made as would be understood by one of ordinary skill in the art based on the disclosure. Therefore, any such changes and modifications are intended to be included within the spirit and scope of the disclosure. For example, a function and the like included in each means, each step and the like can be relocated as long as it does not logically contradict, and a plurality of means, steps or the like may be combined into a single means or step or may be divided.

In the above-described embodiment, the flow of the operations of the information processing system 1 has been described with reference to FIGS. 14 and 16. However, some steps included in the operations, or some operations included in one step may be omitted. The order of a plurality of steps may be changed to the extent where the steps do not logically contradict to each other. Moreover, there may be any other step between the steps.

Further, in the embodiment described above, the first platform 10 may restrict the second user having the first account acquired through the authentication and connection process (that is, the second user who uses the first platform 10 using the specific ID) from using some of the functions provided by the first platform 10. For example, among the functions provided by the first platform 10, use of a function of posting a message on a chat, a bulletin board, etc. may be prohibited by the restriction. In addition, the first platform 10 may prompt the second user to perform the authentication process (for example, telephone number authentication) using the second user's personal information to verify his/her identity. More specifically, the first platform 10 may cause the terminal device 30 of the second user to display a screen for performing the authentication process to verify his/her identity. The first platform 10 may lift the above-mentioned limitation on the available functions when the authentication process is completed. For example, in order to improve the manner of users who use the first platform 10, it is preferable that the administrator of the first platform 10 review the contents of messages and the like written by the users who posted the messages on a chat, message board, etc using the posting function to specify users who write inappropriately. In this respect, according to the above configuration, the users who have not completed the authentication process to verify his/her identity may be restricted from, for example, using the posting function, and the restriction may be removed when the users have completed the authentication process. In this case, for example, even when the second user using the second platform 20 writes inappropriately, it is possible to specify the second user. In this way, it is possible to increase the probability that the manner of the user using the first platform 10 is improved.

Further, in the above-described embodiment, the configuration in which the virtual currency possessed by the user is consumed to acquire a game content in the game has been described. Alternatively any game effect in the game may be generated in according with consumption of the virtual currency. The game effect may include, for example, an effect of shortening a predetermined time that needs to elapse before a predetermined process is executed and an effect of increasing the number of game contents that the user is allowed to possess, but the game effect is not limited thereto.

Further, in the above-described embodiment, the first footer area 512 is included in various screens displayed when the terminal device 30 of the second user having the first account acquired through the authentication and connection process is accessing the first platform 10. In addition, the first footer area 512 may also be included in various screens displayed when the terminal device 30 of the first user having the first account acquired through the user registration is accessing the first platform 10. In this case, the information displayed in the first footer area 512 is different between the first user and the second user. More specifically, in the case of the second user having the first account acquired through the authentication and connection process, any information concerning the second platform 20 is selectably displayed in the first footer area 512 as described above. Whereas in the case of the first user having the first account, any information concerning the first platform 10 is selectably displayed in the first footer area 512. The information may include, for example, a link to the terms of use of the first platform 10, a link to a screen concerning the first user (for example, My page etc.), and information about the second game (for example, an image of the first game, and a link for starting the first game) and the like may be displayed. According to this configuration, in the first footer area 512, information about the first platform 10 is displayed for the first user having the first account acquired through the user registration, while information about the second platform 20 is displayed for the second user having the first account acquired through the authentication and connection process. In this way, information about an appropriate platform can be presented depending on users so that the convenience of the game is improved.

Further, in the above-described embodiment, the configuration in which the second user using the second platform 20 performs the authentication and connection with the first platform 10 has been described. Similarly to the second user using the second platform 20, it is also possible for a third user using a third platform to perform the authentication and connection with the first platform 10. In this configuration, the first platform 10 may manage the second user having the first account acquired through the authentication and connection with the second platform 20 separately from the third user having the first account acquired through the authentication and connection with the third platform. Moreover, functions available in the first platform 10 may be different between the first user and the third user. For example, the first platform 10 provides a plurality of first games to the first user who has acquired the first account through the user registration, while providing only some of the plurality of first games to the second user and the third user who have acquired the first account through the above-described authentication and connection process. Here, the first game provided by the first platform 10 may be different between the second user and the third user. Thus, the embodiment of the disclosure can be implemented even when there are three or more different platforms.

Further, in the above-described embodiment, the first platform 10 may make any function relating to the first virtual currency (for example, a function to purchase, acquire, and consume the first virtual currency) available to the first user having the first account acquired through the user registration, while the first platform 10 may make the function relating to the first virtual currency unavailable to the second user having the first account acquired through the authentication and connection process. For example, the first platform 10 may return an error to the terminal device 30 when the first platform 10 receives a request to use the function concerning the first virtual currency from the terminal device 30 of the second user.

In the above embodiment, at least a part of the screen displayed on the terminal device 30 is displayed as a web page display on the terminal device 30 based on the data created by the first platform 10 or the second platform 20, and at least another part of the screen may be displayed as a native display that is displayed by a native application installed in the terminal device 30. In this manner, the game in the above-described embodiment may be a hybrid game in which the first platform 10 or the second platform 20 and the terminal device 30 execute the corresponding parts of the process respectively.

Moreover, to realize the first server device 11, the second server device 21, or the terminal device 30 of the above-described embodiment, an information processing apparatus such as a computer, a smart phone or the like may be preferably used Such an information processing apparatus stores a program describing a process for realizing the function of the first server device 11, the second server device 21, or the terminal device 30 according to the embodiment respectively in a memory unit of the information processing apparatus. The function can be realized by reading the program by a processor of the information processing apparatus and executing the program.

What is claimed is:

1. An information processing system, comprising:
one or more terminal devices,
one or more server devices, at least one of the one or more server devices being configured to function as a first platform, the first platform comprising one or more first processors configured to:
receive information from a first user using at least a first terminal device of the one or more terminal devices, wherein the first user has a first account to log into the first platform; and
in response to the first user logging into the first platform, provide a first game to the first user; and
at least a second terminal device of the one or more terminal devices being configured to transmit, to the first platform, an authenticated identifier of a second user having a second account of a second platform, the authenticated identifier being authenticated by using information concerning the second account,
wherein at least one of the one or more server devices is configured to function as the second platform, the second platform comprising one or more second processors configured to:
receive the information concerning the second account from the second user using the at least second terminal device, wherein the second user has the second account to log into the second platform; and
in response to the second user logging into the second platform, provide a second game to the second user, and
wherein the first platform is configured to:
generate a specific identifier in response to receiving the authenticated identifier of the second user from the at least second terminal device;
store the authenticated identifier and the specific identifier in association with each other; and
provide the first game to the second user using the specific identifier associated with the authenticated identifier.

2. The information processing system of claim 1, wherein, during execution of the first game, the at least second terminal device is configured to transmit, to the first platform, a request to purchase a game content, and
wherein, upon receiving the purchase request, the first platform is configured to redirect the at least second terminal device to the second platform and cause the second platform to execute at least a part of a payment process related to the purchase request.

3. The information processing system of claim 1, wherein the first platform is configured to transmit information about the second game to the at least second terminal device,
wherein the at least second terminal device is configured to display the information about the second game such that the information is selectable, and transmit, to the first platform, a request to start the second game when the information about the second game is selected, and
wherein, upon receiving the start request, the first platform is configured to redirect the at least second terminal device to the second platform and cause the at least second terminal device to start the second game.

4. The information processing system of claim 1, wherein the first platform is configured to:
provide a plurality of the first games to the first user having the first account, and
provide only some of the plurality of the first games to the second user using the specific identifier.

5. The information processing system of claim 1, wherein the first platform is configured to:
restrict the second user using the specific identifier from using some of functions provided by the first platform;
prompt the second user to perform an authentication process using personal information of the second user to verify his/her identity; and
when the authentication process is completed, provide access to the second user to some of the functions provided by the first platform.

6. The information processing system of claim 1, wherein the first platform is configured to:
store a first record comprising a user identifier of the first user, a password of the first user, first game data associated with the first user, and first virtual currency data associated with the first user; and store a second record comprising the specific identifier of the second user, the authenticated identifier of the second user, and first game data associated with the second user.

7. An information processing system, comprising:
one or more server devices configured to function as a second platform, the second platform being configured to provide a second game to a second user having a second account; and
one or more terminal devices,
wherein the one or more terminal devices are configured to transmit, to the second platform, information concerning the second account of the second user,
wherein the second platform is configured to transmit an authenticated identifier of the second user to the one or more terminal devices, the authenticated identifier being authenticated by using the information concerning the second account, and
wherein the one or more terminal devices are further configured to:
transmit the authenticated identifier of the second user to a first platform, which is configured to provide a first game to a first user having a first account in the first platform and also to provide the first game to the second user, and
start the first game provided to the second user by the first platform, wherein the first game is provided by the first platform using a specific identifier that is generated by the first platform in response to receiving the authenticated identifier of the second user and that is stored by the first platform in association with the authenticated identifier.

8. A terminal device, comprising:
a communication unit; and
a control unit,
wherein the communication unit is configured to communicate with one or more server devices that are configured to function as a first platform the first platform being configured to provide a first game to a first user having a first account in the first platform and also to provide the first game to a second user having a second account in a second platform, and
wherein the control unit is configured to:
transmit a user authentication request using information concerning the second account to the second platform, which is configured to provide the second game to the second user having the second account;
transmit, to the first platform, an authenticated identifier of the second user, the authenticated identifier being authenticated by the second platform in response to the user authentication request; and
start the first game provided to the second user by the first platform, wherein the first game is provided by the first platform using a specific identifier that is generated by the first platform in response to receiving the authenticated identifier of the second user and that is stored by the first platform in association with the authenticated identifier.

9. A computer-readable tangible non-transitory storage medium comprising executable instructions that, when executed, cause a terminal device to perform:
a step of communicating with one or more server devices that are configured to function as a first platform, the first platform being configured to provide a first game to a first user having a first account in the first platform and also to provide the first game to a second user having a second account in a second platform;
a step of transmitting a user authentication request using information concerning a second account to the second platform, which is configured to provide a second game to the second user having the second account;
a step of transmitting, to the first platform, an authenticated identifier of the second user, the authenticated identifier being authenticated by the second platform in response to the user authentication request; and
a step of starting the first game provided to the second user by the first platform, wherein the first game is provided by the first platform using a specific identifier that is generated by the first platform in response to receiving the authenticated identifier of the second user and that is stored by the first platform in association with the authenticated identifier.

10. An information processing method performed by a terminal device, comprising:
a step of communicating with one or more server devices that are configured to function as a first platform, the first platform being configured to provide a first game to a first user having a first account in the first platform and also to provide the first game to a second user having a second account in a second platform;
a step of transmitting a user authentication request using information concerning the second account to the second platform, which is configured to provide a second game to the second user having the second account;
a step of transmitting, to the first platform, an authenticated identifier of the second user, the authenticated identifier being authenticated by the second platform in response to the user authentication request; and
a step of starting the first game provided to the second user by the first platform, wherein the first game is provided by the first platform using a specific identifier that is generated by the first platform in response to receiving the authenticated identifier of the second user and that is stored by the first platform in association with the authenticated identifier.

* * * * *